(12) United States Patent
Zhu et al.

(10) Patent No.: US 12,232,103 B2
(45) Date of Patent: Feb. 18, 2025

(54) COMMUNICATION METHOD OF TRANSMITTING A CONTROL PLANE MESSAGE FOR AN INTERFACE BETWEEN A RADIO BACKHAUL DEVICE AND A RADIO ACCESS DEVICE THROUGH ANOTHER RADIO ACCESS DEVICE

(71) Applicant: HUAWEI TECHNOLOGIES CO., LTD., Shenzhen (CN)

(72) Inventors: Yuanping Zhu, Shanghai (CN); Jing Liu, Shanghai (CN); Mingzeng Dai, Shenzhen (CN); Yulong Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 335 days.

(21) Appl. No.: 17/738,445

(22) Filed: May 6, 2022

(65) Prior Publication Data

US 2022/0264602 A1 Aug. 18, 2022

Related U.S. Application Data

(63) Continuation of application No. PCT/CN2019/116420, filed on Nov. 7, 2019.

(51) Int. Cl.
*H04W 72/1263* (2023.01)
*H04W 48/20* (2009.01)
(Continued)

(52) U.S. Cl.
CPC ....... *H04W 72/1263* (2013.01); *H04W 48/20* (2013.01); *H04W 72/543* (2023.01); *H04W 88/14* (2013.01); *H04W 92/24* (2013.01)

(58) Field of Classification Search
CPC ............... H04W 92/24; H04W 88/085; H04W 88/14; H04W 72/1263; H04W 72/543; H04W 48/20
See application file for complete search history.

(56) References Cited

U.S. PATENT DOCUMENTS

| 2021/0298000 A1* | 9/2021 | Park ................... H04L 5/0098 |
| 2022/0248495 A1* | 8/2022 | Mildh .................. H04W 76/27 |
| 2022/0295579 A1* | 9/2022 | Mildh .................. H04W 76/12 |

FOREIGN PATENT DOCUMENTS

| CN | 110381608 A | 10/2019 |
| EP | 3734858 A1 | 11/2020 |

(Continued)

OTHER PUBLICATIONS

Huawei, HiSilicon, "R2-1912375—BAP and RLC configurations", Oct. 2019, 3GPP TSG-RAN WG2 meeting #107bis, pp. 1-7. (Year: 2019).*

(Continued)

*Primary Examiner* — Robert C Scheibel
(74) *Attorney, Agent, or Firm* — HAUPTMAN HAM, LLP

(57) ABSTRACT

A communication method and apparatus are provided. The method includes: An IAB donor gNodeB determines first indication information, and then sends a first message to an eNB, where the first message includes a first control plane message and the first indication message; and the eNB may determine a first radio bearer based on the first indication information in the received first message, and then sends a second message including the first control plane message to an IAB node by using the first radio bearer. The first radio bearer corresponds to a type of a downlink F1AP message, so that the eNB selects different radio bearers for different (Continued)

types of downlink F1AP messages, thereby providing an effective QoS guarantee for a service of a terminal.

17 Claims, 11 Drawing Sheets

(51) Int. Cl.
*H04W 72/543* (2023.01)
*H04W 88/14* (2009.01)
*H04W 92/24* (2009.01)

(56) References Cited

FOREIGN PATENT DOCUMENTS

| EP | 3783987 A1 | 2/2021 |
|---|---|---|
| EP | 3790336 A1 | 3/2021 |
| EP | 3926912 A1 | 12/2021 |
| EP | 4044543 A1 | 8/2022 |
| WO | 2019137504 A1 | 7/2019 |
| WO | 2019142064 A1 | 7/2019 |

OTHER PUBLICATIONS

ZTE, Sanechips, "R2-1912590—Discussion on BH RLC channel configuration in IAB network", Oct. 2019, 3GPP TSG RAN WG2 Meeting #107bis, pp. 1-5. (Year: 2019).*

Qualcomm Incorporated, "R2-1914186—IAB routing and bearer mapping config", Oct. 2019, 3GPP TSG-RAN WG2 meeting #107bis, pp. 1-11. (Year: 2019).*

Extended European Search Report issued in corresponding European Application No. 19951732.7, dated Sep. 28, 2022, pp. 1-7.

Huawei, "CP signalling transmission in IAB NSA", 3GPP TSG-RAN WG3 #102 R3-186538, Nov. 16, 2018, total 8 pages.

Huawei, "Discussion on control plane transmission in NSA (option c)", 3GPP TSG-RAN WG3 meeting #105bis R3-195460, Oct. 18, 2019, total 3 pages.

KDDI Corporation et al., "IAB with NSA operation", 3GPP TSG-RAN WG2 Meeting #106 R2-1906537, May 17, 2019, total 5 pages.

International Search Report issued in corresponding International Application No. PCT/CN2019/116420, dated Jul. 27, 2020, pp. 1-14.

* cited by examiner

COMMUNICATION METHOD OF TRANSMITTING A CONTROL PLANE MESSAGE FOR AN INTERFACE BETWEEN A RADIO BACKHAUL DEVICE AND A RADIO ACCESS DEVICE THROUGH ANOTHER RADIO ACCESS DEVICE

CROSS-REFERENCE TO RELATED APPLICATIONS

This application is a continuation of International Application No. PCT/CN2019/116420, filed on Nov. 7, 2019, the disclosures of which is incorporated herein by reference in its entirety.

TECHNICAL FIELD

This application relates to the field of communication technologies, and in particular, to a communication method and apparatus.

BACKGROUND

An integrated access and backhaul (integrated access and backhaul, IAB) network technology is introduced into a 5th generation mobile communication system (5th generation, 5G). A radio transmission solution is used for both an access link (access link) and a backhaul link (backhaul link) in an IAB network, to avoid optical fiber deployment, thereby reducing deployment costs and improving deployment flexibility. In the IAB network, an IAB donor gNodeB (IAB donor gNodeB, IAB DgNB) is connected to a core network (for example, a core network (5G core, 5GC) in a 5G system) through a wired link, and then an integrated access and backhaul node (integrated access and backhaul node, IAB node) is added between the IAB donor gNodeB and a terminal. A radio access service is provided for the terminal through an access link (access link, AL) of the IAB node, and the IAB node is connected to the IAB donor gNodeB through a backhaul link (backhaul link, BL) of the IAB node, to transmit service data of the terminal.

In the backhaul link, a radio bearer (for example, a data radio bearer (data radio bearer, DRB) and/or a signaling radio bearer (signaling radio bearer, SRB)) generated by the terminal is mapped to a logical channel (logical channel, LCH) for transmission. Currently, for an IAB network in non-standalone (non-standalone, NSA) networking, an F1 application protocol (F1 application protocol, F1 AP) message on an F1 interface between an IAB node and an IAB donor gNodeB is transmitted through a backhaul link, and the IAB donor gNodeB may alternatively transmit the F1 AP message to the IAB node through an air interface of a long term evolution (long term evolution, LTE) system. However, according to the foregoing method for transmitting an F1AP message through an LTE link, an effective quality of service (quality of service, QoS) guarantee cannot be provided for a service of a terminal, that is, a QoS requirement of a terminal cannot be ensured. In this case, the method may cause discontinuity of the service of the terminal.

SUMMARY

This application provides a communication method and apparatus. The method can provide a QoS guarantee for a terminal, and ensure continuity of a service of the terminal.

A first aspect provides a communication method. The method includes the following steps: In a network architecture in which both a first radio access device and a second radio access device are connected to a first radio backhaul device, the first radio access device receives a first message from the second radio access device, where the first message includes a first control plane message and first indication information. Then, the first radio access device determines a first radio bearer based on the first indication information. Then, the first radio access device sends a second message including the first control plane message to the first radio backhaul device by using the first radio bearer.

In this embodiment of this application, the first radio access device and the second radio access device may be radio access devices of different communication standards. For example, the first radio access device is an eNB, the second radio access device is an IAB donor gNodeB, the first radio backhaul device is an IAB node, and the first control plane message may be a downlink F1AP message. The eNB may determine, based on the first indication information indicated by the IAB donor gNodeB, and the first radio bearer used to carry the downlink F1 AP message, to select different radio bearers for different types of downlink F1AP messages, thereby providing an effective QoS guarantee for a service of a terminal.

In a possible design, the first radio bearer is an SRB between the first radio backhaul device and the first radio access device. The first indication information may be used to indicate an identifier of the first radio bearer. In other words, the IAB donor gNodeB directly sends, to the eNB, the first indication information used to indicate the identifier of the first radio bearer, and the eNB may directly determine the first radio bearer based on the identifier of the first radio bearer. In this embodiment of this application, the IAB donor gNodeB sends the first indication information, so that the eNB quickly determines the first radio bearer corresponding to the F1AP message. Signaling overheads in this method are low.

In a possible design, the first indication information may be used to indicate a first type of the first control plane message. In this case, the first radio access device further needs to receive a configuration message from the second radio access device, where the configuration message includes a mapping relationship between the first type of the first control plane message and the first radio bearer. Therefore, the first radio access device determines, based on the configuration message and the first indication information, the first radio bearer corresponding to the first type of the first control plane message. In this embodiment of this application, the IAB donor gNodeB sends the first indication information, so that the eNB quickly determines the first radio bearer corresponding to the F1 AP message.

A second aspect provides a communication method. The method includes the following steps: In a network architecture in which both a first radio access device and a second radio access device are connected to a first radio backhaul device, the second radio access device determines first indication information, and then sends, to the first radio access device, a first message including the first indication information, where the first indication information is used to determine a first radio bearer corresponding to a first control plane message transmitted between the first radio access device and the first radio backhaul device.

In this embodiment of this application, the first radio access device and the second radio access device may be radio access devices of different communication standards. For example, the first radio access device is an eNB, the second radio access device is an IAB donor gNodeB, the first radio backhaul device is an IAB node, and the first control plane message may be a downlink F1AP message. The IAB donor gNodeB sends the first indication information to the eNB, and the eNB determines, based on the first indication information, the first radio bearer used to carry the downlink F1AP message, to select different radio bearers for different types of downlink F1AP messages, thereby providing an effective QoS guarantee for a service of a terminal.

In a possible design, the first radio bearer is an SRB between the first radio backhaul device and the first radio access device. The first indication information may be used to indicate an identifier of the first radio bearer. In other words, the IAB donor gNodeB directly sends, to the eNB, the first indication information used to indicate the identifier of the first radio bearer, and the eNB may directly determine the first radio bearer based on the identifier of the first radio bearer. In this embodiment of this application, the IAB donor gNodeB sends the first indication information, so that the eNB quickly determines the first radio bearer corresponding to the F1AP message. Signaling overheads in this method are low.

In a possible design, the first indication information may be used to indicate a first type of the first control plane message. In this case, the first radio access device further needs to receive a configuration message from the second radio access device, where the configuration message includes a mapping relationship between the first type of the first control plane message and the first radio bearer. Therefore, the first radio access device determines, based on the configuration message and the first indication information, the first radio bearer corresponding to the first type of the first control plane message. In this embodiment of this application, the IAB donor gNodeB sends the first indication information, so that the eNB quickly determines the first radio bearer corresponding to the F1 AP message.

A third aspect provides a communication method. The method includes the following steps: In a network architecture in which both a first radio access device and a second radio access device are connected to a first radio backhaul device, the first radio backhaul device receives a configuration message, where the configuration message includes a correspondence between a first radio bearer and a first type of a control plane message. The first radio backhaul device obtains a second control plane message, where a type of the second control plane message is the first type. The first radio backhaul device determines, based on the configuration message, the first radio bearer corresponding to the first type of the second control plane message, and then sends a third message including the second control plane message to the first radio access device by using the first radio bearer.

In this embodiment of this application, the first radio access device and the second radio access device may be radio access devices of different communication standards. For example, the first radio access device is an eNB, the second radio access device is an IAB donor gNodeB, the first radio backhaul device is an IAB node, the second control plane message may be an uplink F1 AP message, and the first radio bearer is an SRB between the first radio backhaul device and the first radio access device. The IAB node may determine, based on the correspondence in the configuration message sent by the IAB donor gNodeB, the first radio bearer used to carry the uplink F1AP message of the first type, to select different radio bearers for different types of uplink F1AP messages, thereby providing an effective QoS guarantee for a service of a terminal.

In a possible design, the first radio backhaul device receives the configuration message from the second radio access device. Alternatively, the first radio backhaul device receives the configuration message from the first radio access device. Optionally, the configuration message in the first radio access device may be obtained from the second access device.

In a possible design, the first radio backhaul device may further receive a fifth message from the first radio access network device, where the fifth message includes a mapping relationship between a first IP address and a first air interface. After obtaining the second control plane message, the first radio backhaul device determines that an air interface corresponding to the first IP address in the second control plane message is the first air interface, where the first air interface is an air interface between the first radio backhaul device and the first radio access network device, and then the first radio backhaul device determines the first radio bearer on the first air interface. In other words, when determining to transmit the F1 AP message through the first air interface (for example, an LTE air interface), the first radio device determines the first radio bearer by using the mapping relationship in the configuration message.

A fourth aspect provides a communication method. The method includes the following steps: In a network architecture in which both a first radio access device and a second radio access device are connected to a first radio backhaul device, the first radio access device receives, from the first radio backhaul device by using a first radio bearer, a third message including a second control plane message, and then sends a fourth message including the second control plane message to the second radio access network device, so that the first radio access device sends the second control plane message in the fourth message to the second radio access device.

In this embodiment of this application, the first radio access device and the second radio access device may be radio access devices of different communication standards. For example, the first radio access device is an eNB, the second radio access device is an IAB donor gNodeB, the first radio backhaul device is an IAB node, the second control plane message may be an uplink F1 AP message, and the first radio bearer is an SRB between the first radio backhaul device and the first radio access device. The IAB node may determine, based on a correspondence in a configuration message sent by the IAB donor gNodeB, the first radio bearer used to carry the uplink F1AP message of a first type, to select different radio bearers for different types of uplink F1AP messages, thereby providing an effective QoS guarantee for a service of a terminal.

In a possible implementation, before receiving the third message, the first radio access network device sends a configuration message to the first radio backhaul device, where the configuration message includes a mapping relationship between the radio bearer and a first type of a second control plane message. Then, the first radio backhaul device may determine the first radio bearer based on the mapping relationship.

In a possible implementation, the first radio access network device may obtain the configuration message from the second radio access network device in advance.

A fifth aspect provides a communication method. The method includes the following steps: In a network architecture in which both a first radio access device and a second radio access device are connected to a first radio backhaul device, the second radio access network device generates a configuration message, where the configuration message includes a correspondence between a first radio bearer and a first type of a control plane message, and then the second radio access network device sends the configuration message to the first radio backhaul device or the first radio access device.

In this embodiment of this application, after the second radio access network device sends the configuration message to the first radio backhaul device, the first radio backhaul device may determine the first radio bearer based on the mapping relationship in the configuration message, to select different radio bearers for different types of uplink F1AP messages, thereby providing an effective QoS guarantee for a service of a terminal. After the second radio access network device sends the configuration message to the first radio access device, the first radio access device may forward the configuration message to the first radio backhaul device, and then the first radio backhaul device may determine the first radio bearer based on the mapping relationship in the configuration message, to select different radio bearers for different types of uplink F1AP messages, thereby providing an effective QoS guarantee for a service of a terminal.

A sixth aspect provides a communication method. The method includes the following steps: A first node sends a broadcast message, where the broadcast message includes indication information, where the indication information is used to indicate that the first node is capable of supporting access of an IAB node. After receiving the broadcast message, a second node obtains the indication information from the broadcast message, and determines that the first node supports access of the IAB node. Then, the second node sends a notification message to a third node, where the notification message includes indication information indicating that the first node or a cell served by the first node supports access of the IAB node. The third node determines that the first node is a secondary base station of the second node, or selects the cell served by the first node as a secondary cell of the second node.

In this embodiment of this application, a primary serving base station of the IAB node may select, for the IAB node, a secondary base station supporting access of the IAB node, to avoid a case in which the IAB node is not capable of providing a backhaul service for UE by using a secondary cell because a selected secondary base station is not capable of supporting access of the IAB node.

According to a seventh aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the first aspect or the possible designs of the first aspect. Optionally, the communication apparatus may further include the memory. Optionally, the communication apparatus may further include a transceiver, configured to support the communication apparatus in sending and/or receiving information in the foregoing method. Optionally, the communication apparatus may be a first radio access device, or may be an apparatus in the first radio access device, for example, a chip or a chip system. The chip system includes at least one chip, and the chip system may further include another circuit structure and/or a discrete device.

An eighth aspect provides a communication apparatus. The apparatus may be a first radio access device, an apparatus in the first radio access device, or an apparatus that can be used together with the first radio access device. In a design, the apparatus may include corresponding modules used to perform the methods/operations/steps/actions described in the aspects. The modules may be implemented by a hardware circuit, software, or a combination of a hardware circuit and software. For example, the apparatus may include a transceiver module and a processing module. The transceiver module and the processing module may perform corresponding functions in any design example in the first aspect. For functions of the transceiver module and the processing module, refer to the records in the first aspect. Details are not described herein again.

According to a ninth aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the second aspect or the possible designs of the second aspect. Optionally, the communication apparatus may further include the memory. Optionally, the communication apparatus may further include a transceiver, configured to support the communication apparatus in sending and/or receiving information in the foregoing method. Optionally, the communication apparatus may be a second radio access device, or may be an apparatus in the second radio access device for example, a chip or a chip system. The chip system includes at least one chip, and the chip system may further include another circuit structure and/or a discrete device.

A tenth aspect provides a communication apparatus. The apparatus may be a second radio access device, an apparatus in the second radio access device, or an apparatus that can be used together with the second radio access device. In a design, the apparatus may include corresponding modules used to perform the methods/operations/steps/actions described in the aspects. The modules may be implemented by a hardware circuit, software, or a combination of a hardware circuit and software. For example, the apparatus may include a transceiver module and a processing module. The transceiver module and the processing module may perform corresponding functions in any design example in the second aspect. For functions of the transceiver module and the processing module, refer to the records in the second aspect. Details are not described herein again.

According to an eleventh aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the third aspect or the possible designs of the third aspect. Optionally, the communication apparatus may further include the memory. Optionally, the communication apparatus may further include a transceiver, configured to support the communication apparatus in sending and/or receiving information in the foregoing method. Optionally, the communication apparatus may be a first radio backhaul device, or may be an apparatus in the first radio backhaul device, for example, a chip or a chip system. The chip system includes at least one chip, and the chip system may further include another circuit structure and/or a discrete device.

A twelfth aspect provides a communication apparatus. The apparatus may be a first radio backhaul device, an apparatus in the first radio backhaul device, or an apparatus that can be used together with the first radio backhaul device. In a design, the apparatus may include corresponding modules used to perform the methods/operations/steps/ actions described in the aspects. The modules may be implemented by a hardware circuit, software, or a combination of a hardware circuit and software. For example, the apparatus may include a transceiver module and a processing module. The transceiver module and the processing module may perform corresponding functions in any design example in the third aspect. For functions of the transceiver module and the processing module, refer to the records in the third aspect. Details are not described herein again.

According to a thirteenth aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the fourth aspect or the possible designs of the fourth aspect. Optionally, the communication apparatus may further include the memory. Optionally, the communication apparatus may further include a transceiver, configured to support the communication apparatus in sending and/or receiving information in the foregoing method. Optionally, the communication apparatus may be a first radio access device, or may be an apparatus in the first radio access device, for example, a chip or a chip system. The chip system includes at least one chip, and the chip system may further include another circuit structure and/or a discrete device.

A fourteenth aspect provides a communication apparatus. The apparatus may be a first radio access device, an apparatus in the first radio access device, or an apparatus that can be used together with the first radio access device. In a design, the apparatus may include corresponding modules used to perform the methods/operations/steps/actions described in the aspects. The modules may be implemented by a hardware circuit, software, or a combination of a hardware circuit and software. For example, the apparatus may include a transceiver module and a processing module. The transceiver module and the processing module may perform corresponding functions in any design example in the fourth aspect. For functions of the transceiver module and the processing module, refer to the records in the fourth aspect. Details are not described herein again.

According to a fifteenth aspect, an embodiment of this application provides a communication apparatus. The communication apparatus includes a processor, and the processor is coupled to a memory. The memory is configured to store instructions, and the processor is configured to execute the instructions stored in the memory, to perform the method according to any one of the fifth aspect or the possible designs of the fifth aspect. Optionally, the communication apparatus may further include the memory. Optionally, the communication apparatus may further include a transceiver, configured to support the communication apparatus in sending and/or receiving information in the foregoing method. Optionally, the communication apparatus may be a second radio access device, or may be an apparatus in the second radio access device, for example, a chip or a chip system. The chip system includes at least one chip, and the chip system may further include another circuit structure and/or a discrete device.

A sixteenth aspect provides a communication apparatus. The apparatus may be a second radio access device, an apparatus in the second radio access device, or an apparatus that can be used together with the second radio access device. In a design, the apparatus may include corresponding modules used to perform the methods/operations/steps/actions described in the fifth aspect. The modules may be implemented by a hardware circuit, software, or a combination of a hardware circuit and software. For example, the apparatus may include a transceiver module and a processing module. The transceiver module and the processing module may perform corresponding functions in any design example in the fifth aspect. For functions of the transceiver module and the processing module, refer to the records in the fifth aspect. Details are not described herein again.

According to a seventeenth aspect, an embodiment of this application provides a communication apparatus. The communication apparatus includes a processor, and the processor is coupled to a memory. The memory is configured to store instructions. The processor is configured to execute the instructions stored in the memory, to perform the method according to any one of the sixth aspect or the possible designs of the sixth aspect. Optionally, the communication apparatus may further include the memory. Optionally, the communication apparatus may further include a transceiver, configured to support the communication apparatus in sending and/or receiving information in the foregoing method. Optionally, the communication apparatus may be a second node, or may be an apparatus in the second node, for example, a chip or a chip system. The chip system includes at least one chip, and the chip system may further include another circuit structure and/or a discrete device.

An eighteenth aspect provides a communication apparatus. The apparatus may be a second node, an apparatus in the second node, or an apparatus that can be used together with the second node. In a design, the apparatus may include corresponding modules used to perform the methods/operations/steps/actions described in the fifth aspect. The modules may be implemented by a hardware circuit, software, or a combination of a hardware circuit and software. For example, the apparatus may include a transceiver module and a processing module. The transceiver module and the processing module may perform corresponding functions in any design example in the sixth aspect. For functions of the transceiver module and the processing module, refer to the records in the sixth aspect. Details are not described herein again.

According to a nineteenth aspect, an embodiment of this application provides an apparatus. The apparatus includes a processor, configured to implement the method described in the first aspect, or configured to implement the method described in the second aspect. The apparatus may further include a memory, configured to store instructions and/or data. The memory is coupled to the processor. When executing program instructions stored in the memory, the processor may perform the method described in the first aspect or the method described in the second aspect. The apparatus may further include a communication interface. The communication interface is used by the apparatus to communicate with another device. For example, the communication interface may be a transceiver, a circuit, a bus, a module, a pin, or another type of communication interface. The another device may be a network device or the like. In a possible implementation, if the apparatus is configured to implement the method described in the first aspect, the apparatus includes:

a memory, configured to store program instructions;

a communication interface, configured to receive a first message from a second radio access device, where the first message includes a first control plane message and first indication information; and a processor, configured to determine a first radio bearer based on the first indication information.

The communication interface is further configured to send a second message including the first control plane message to a first radio backhaul device by using the first radio bearer.

In a possible implementation, if the apparatus is configured to implement the method described in the second aspect, the apparatus includes:

a memory, configured to store program instructions;
a communication interface, configured to receive a first message from a second radio access device, where the first message includes a first control plane message and first indication information; and
a processor, configured to determine the first indication information.

The communication interface is further configured to send the first message including the first indication information to a first radio access device.

For functions and beneficial effects of the processor and the communication interface, refer to the records in the first aspect or the records in the second aspect. Details are not described herein again.

According to a twentieth aspect, an embodiment of this application provides an apparatus. The apparatus includes a processor, configured to implement the method described in the third aspect, or configured to implement the method described in the fourth aspect, or configured to implement the method described in the fifth aspect. The apparatus may further include a memory, configured to store instructions and/or data. The memory is coupled to the processor. When executing program instructions stored in the memory, the processor can perform the method described in the second aspect, the method described in the fourth aspect, or the method described in the fifth aspect. The apparatus may further include a communication interface. The communication interface is used by the apparatus to communicate with another device. For example, the communication interface may be a transceiver, a circuit, a bus, a module, a pin, or another type of communication interface. The another device may be a terminal device or the like.

In a possible implementation, if the apparatus is configured to implement the method described in the third aspect, the apparatus includes:

The apparatus includes:
a memory, configured to store program instructions;
a communication interface, configured to receive a configuration message, where the configuration message includes a correspondence between a first radio bearer and a first type of a control plane message; and
a processor, configured to obtain the second control plane message, where a type of the second control plane message is the first type, and a first radio backhaul device determines, based on the configuration message, the first radio bearer corresponding to the first type of the second control plane message.

The communication interface is configured to send a third message including the second control plane message to a first radio access device by using the first radio bearer.

If the apparatus is configured to implement the method described in the fourth aspect, the apparatus includes:

The apparatus includes:
a memory, configured to store program instructions;
a communication interface, configured to receive a third message including a second control plane message from a first radio backhaul device by using a first radio bearer; and
a processor, configured to determine a second radio access device based on a destination address of the second control plane message.

The communication interface is configured to send a fourth message including the second control plane message to a second radio access network device, so that a first radio access device sends the second control plane message in the fourth message to the second radio access device.

If the apparatus is configured to implement the method described in the fifth aspect, the apparatus includes:

The apparatus includes:
a memory, configured to store program instructions; and
a processor, configured to generate a configuration message, where the configuration message includes a correspondence between a first radio bearer and a first type of a control plane message; and
a communication interface, configured to send the configuration message to a first radio backhaul device or a first radio access device.

For functions and beneficial effects of the processor and the communication interface, refer to the records in the third aspect, the records in the fourth aspect, or the records in the fifth aspect. Details are not described herein again.

According to a twenty-first aspect, an embodiment of this application further provides a computer-readable storage medium, including instructions. When the instructions are run on a computer, the computer is enabled to perform the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, or the method in any one of the sixth aspect or the possible designs of the sixth aspect.

According to a twenty-second aspect, an embodiment of this application further provides a chip system. The chip system includes a processor, and may further include a memory, to implement the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, or the method in any one of the sixth aspect or the possible designs of the sixth aspect. The chip system may include a chip, or may include a chip and another discrete device.

According to a twenty-third aspect, an embodiment of this application further provides a computer program product, including instructions. When the product runs on a computer, the computer is enabled to perform the method in any one of the first aspect or the possible designs of the first aspect, the method in any one of the second aspect or the possible designs of the second aspect, the method in any one of the third aspect or the possible designs of the third aspect, the method in any one of the fourth aspect or the possible designs of the fourth aspect, the method in any one of the fifth aspect or the possible designs of the fifth aspect, or the method in any one of the sixth aspect or the possible designs of the sixth aspect.

According to a twenty-fourth aspect, an embodiment of this application provides a system. The system includes the sixth aspect or the apparatus described in the sixth aspect to the twentieth aspect or the apparatus described in the twentieth aspect.

DESCRIPTION OF EMBODIMENTS

The following further describes in detail embodiments of this application with reference to accompanying drawings.

Embodiments of this application may be applied to various mobile communication systems, for example, a new radio (new radio, NR) system, a long term evolution (long term evolution, LTE) system, an advanced long term evolution (advanced long term evolution, LTE-A) system, an evolved long term evolution (evolved long term evolution, eLTE) system, a future communication system, and another communication system. Specifically, this is not limited herein.

Figure 1A:
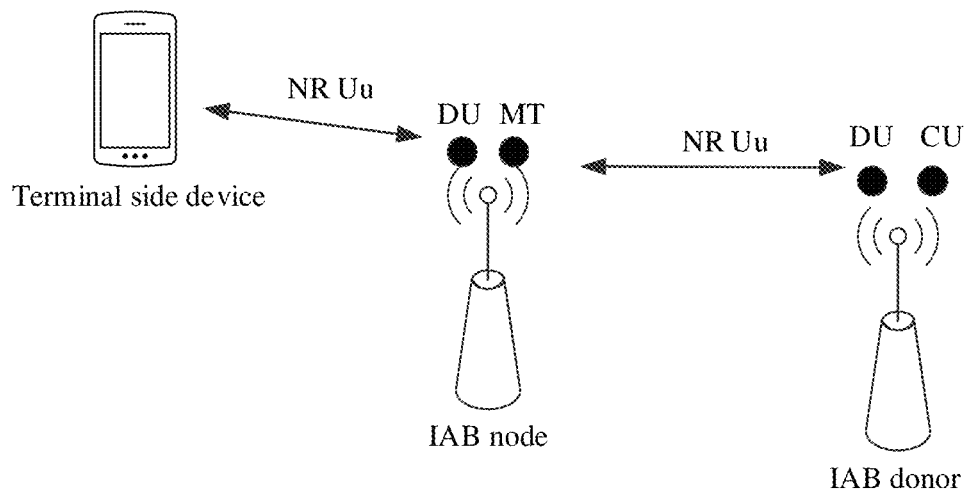
FIG. 1A and FIG. 1B are a schematic diagram of a network architecture according to an embodiment of this application.
Figure 1B:
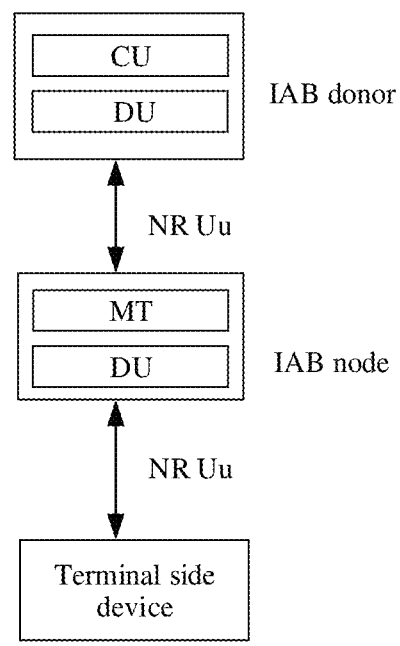

For ease of understanding embodiments of this application, a communication system shown in FIG. 1A is first used as an example to describe in detail a communication system applicable to embodiments of this application. FIG. 1A is a schematic diagram of a communication system to which a communication method in embodiments of this application is applicable. As shown in FIG. 1A, the communication system includes an IAB donor gNodeB, an IAB node, and a terminal side device. FIG. 1B is another expression form of the communication system shown in FIG. 1A. Meanings of substantive expressions are consistent, and details are not described herein again.

In addition, FIG. 1A and FIG. 1B further show names of interfaces between devices, for example, a radio interface (which is named as an NR Uu interface in the figure) between the terminal side device and the IAB node and a radio interface (which may be referred to as an NR radio backhaul interface, and is named as an NR Uu interface in the figure because communication through the interface is performed also based on an NR Uu interface protocol) between the IAB node and the IAB donor gNodeB. The names of these interfaces are merely examples, and do not represent a limitation on the interfaces. When a release of the communication system changes, a corresponding name may also be replaced with a name of a corresponding function in another radio communication network.

An IAB network shown in FIG. 1A supports multi-hop networking. For example, there may be one or more intermediate IAB nodes between the IAB node and the IAB donor gNodeB shown in FIG. 1A and FIG. 1B.

The IAB network shown in FIG. 1A supports both multi-hop networking and multi-connection networking. There may be at least one transmission path including a plurality of links between the terminal side device served by the IAB node and the IAB donor. Alternatively, there may be one or more transmission paths between the IAB node and the IAB donor, and each transmission path may include one or more IAB nodes. On a transmission path, each IAB node considers an adjacent node that provides an access and backhaul service for the IAB node as a parent node, and correspondingly, each IAB node may be considered as a child node of the parent node of the IAB node. For example, in the scenarios shown in FIG. 1A and FIG. 1B, a parent node of the IAB node is the IAB donor, and the IAB donor considers the IAB node as a child node.

Figure 2A:
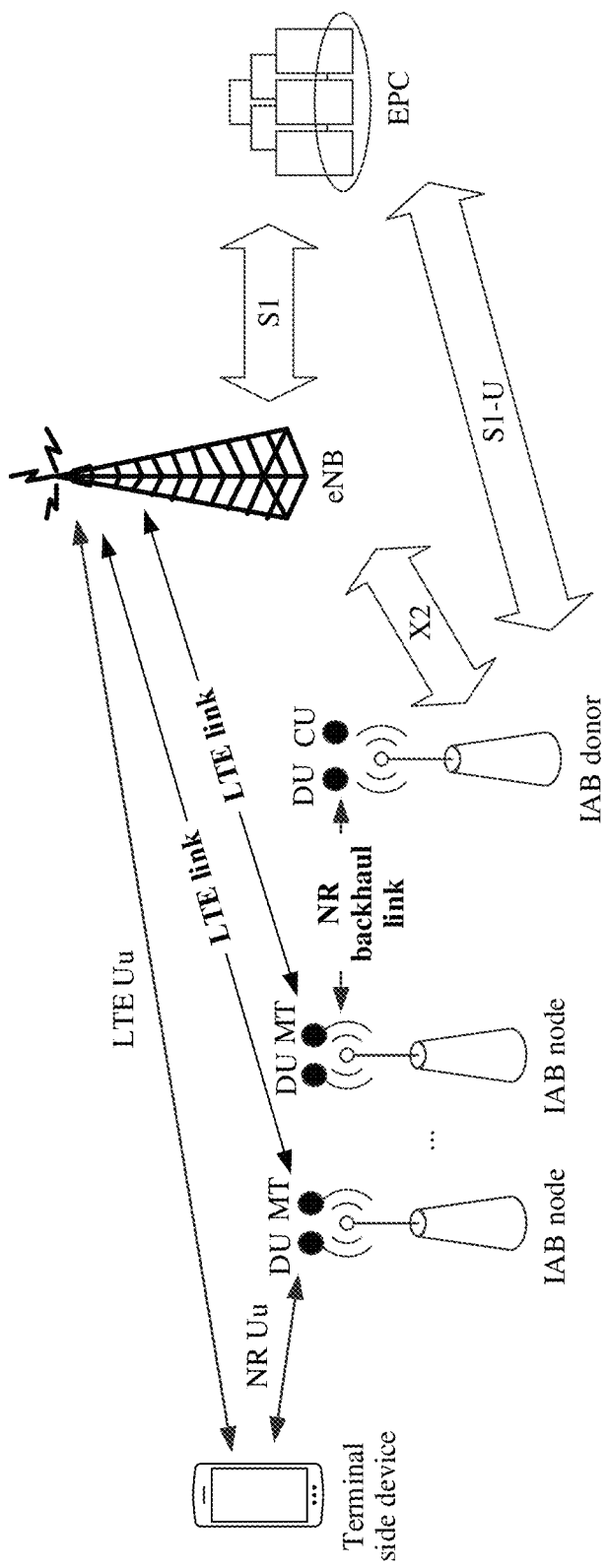
FIG. 2A and FIG. 2B are a schematic diagram of another network architecture according to an embodiment of this application.
Figure 2B:
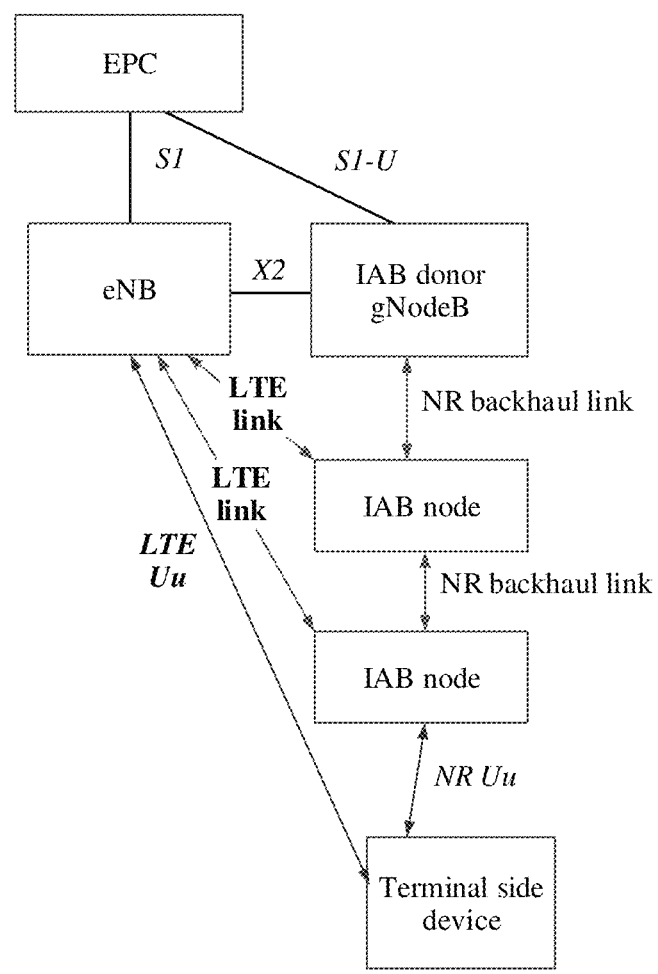

It should be noted that the IAB networking scenario shown in FIG. 1A is merely an example. In an IAB scenario combining multi-hop and multi-connection, there may be another connection form. For example, this application may be further applied to a dual connectivity scenario. Details may be shown in FIG. 2A. FIG. 2A shows a schematic diagram of a network architecture of an E-UTRAN NR dual connectivity (E-UTRAN NR Dual Connectivity, EN-DC) system. As shown in FIG. 2A, the communication system includes a packet data core network (evolved packet core, EPC) device, a base station (eNB) in an LTE system, an IAB donor, IAB nodes, and a terminal side device. An EN-DC networking manner shown in FIG. 2A may also be referred to as non-standalone (non-standalone, NSA) networking of an IAB network. FIG. 2B is another expression form of the communication system shown in FIG. 2A. Meanings of substantive expressions are consistent, and details are not described herein again.

In FIG. 2A, the base station (eNB in the figure) in the LTE system is a master base station (which therefore may also be referred to as a Master eNB, MeNB for short), provides an LTE air interface (LTE Uu) connection for the IAB nodes, and performs user plane data transmission and control plane data transmission with the core network EPC through an S1 interface. The IAB donor gNodeB is a secondary base station, provides an NR air interface (NR Uu) connection for the IAB nodes, and performs user plane data transmission with the core network EPC through the S1 interface. Similarly, the terminal side device also supports dual connectivity. UE is connected to the master base station (eNB) through the LTE Uu interface, and is connected to the secondary base station (the IAB nodes or the IAB donor gNodeB) through the NR Uu interface.

It should be noted that FIG. 2A is merely a networking example, and NSA networking of the IAB network also supports multi-hop IAB networking. For example, the terminal device in FIG. 2A and FIG. 2B may be connected to the IAB donor gNodeB by using two or more IAB nodes, that is, the IAB nodes may be connected to the IAB donor gNodeB through a multi-hop backhaul link. The NSA networking of the IAB network also supports single-hop IAB networking. For example, the terminal device in FIG. 2A and FIG. 2B may be connected to the IAB donor gNodeB by using one IAB node. In addition, when being connected to the eNB, the IAB node communicates with the eNB through a single-hop LTE link.

In addition, it should be noted that a dual connectivity scenario to which this application is applicable may be not only the EN-DC networking scenario shown in FIG. 2A and FIG. 2B, but also dual connectivity scenario formed by an IAB network and an IAB network, or a connection scenario between an IAB network and another future communication system. The foregoing example does not constitute a limitation on the scenario.

In embodiments of this application, the IAB node may also be referred to as a relay node (relay node, RN). For ease of description, the IAB node is referred to as an IAB node below. The IAB node may include at least one mobile terminal (mobile terminal, MT) unit and at least one distributed unit (distributed unit, DU). In FIG. 1A and FIG. 2A, only an example in which the IAB node includes one MT unit and one DU is used for description. The MT unit in the IAB node enables the IAB to serve as a terminal to communicate with a parent node of the IAB node and an IAB donor node, and has a function of a user equipment (user equipment, UE). The DU in the IAB node provides an access service for the terminal side device or another IAB node attached to the DU, and may also communicate with the IAB donor node through an F1 interface. The MT in the IAB node may also be referred to as an MT functional entity in the IAB node, and the DU in the IAB node may also be referred to as a DU functional entity in the IAB node. For ease of description, each of the MT in the IAB node and the MT functional entity in the IAB node are briefly referred to as an "IAB node MT", and each of the DU in the IAB node and the DU functional entity in the IAB node are briefly referred to as an "IAB node DU". The IAB node may provide a radio access service for the terminal side device, and service data or control information of the terminal side device is transmitted from the IAB node to the IAB donor (IAB donor) or a network side device through a radio backhaul link.

The IAB donor may be an access network element having a complete base station function, or may be an access network element in a form in which a centralized unit (centralized unit, CU) is separated from a distributed unit (distributed unit, DU). The CU in the IAB donor may also be referred to as a CU functional entity in the IAB donor, and the DU in the IAB donor may also be referred to as a DU functional entity in the IAB donor.

For ease of description, in embodiments of this application, the CU in the IAB donor and the CU functional entity in the IAB donor are briefly referred to as IAB donor CUs (also referred to as IAB-donor-CUs), and the DU in the IAB donor and the DU functional entity in the IAB donor are briefly referred to as IAB donor DUs (also referred to as IAB-donor-DUs). The IAB donor CU may alternatively be in a form in which a control plane (control plane, CP) is separated from a user plane (user plane, UP). For example, one IAB donor CU includes one CU-CP (also referred to as an IAB-donor-CU-CP) and a plurality of CU-UPs (also referred to as IAB-donor-CU-UPs). This is not limited in embodiments of this application.

The F1 interface in embodiments of this application is an interface between the DU of the IAB node and the IAB donor gNodeB, an interface between the DU of the IAB node and the CU of the IAB donor gNodeB, or an interface between the IAB node and the IAB donor gNodeB. The F1 interface may also be referred to as an F1* interface. For ease of description, the F1 interface may be collectively referred to as an F1 interface in embodiments of this application, but the name is not limited.

It should be noted that the F1 interface may also be an interface between functional entities in a device. For example, for a base station including a DU and a CU, the F1 interface may be an interface between the DU in the base station and the CU in the base station.

Figure 3A:
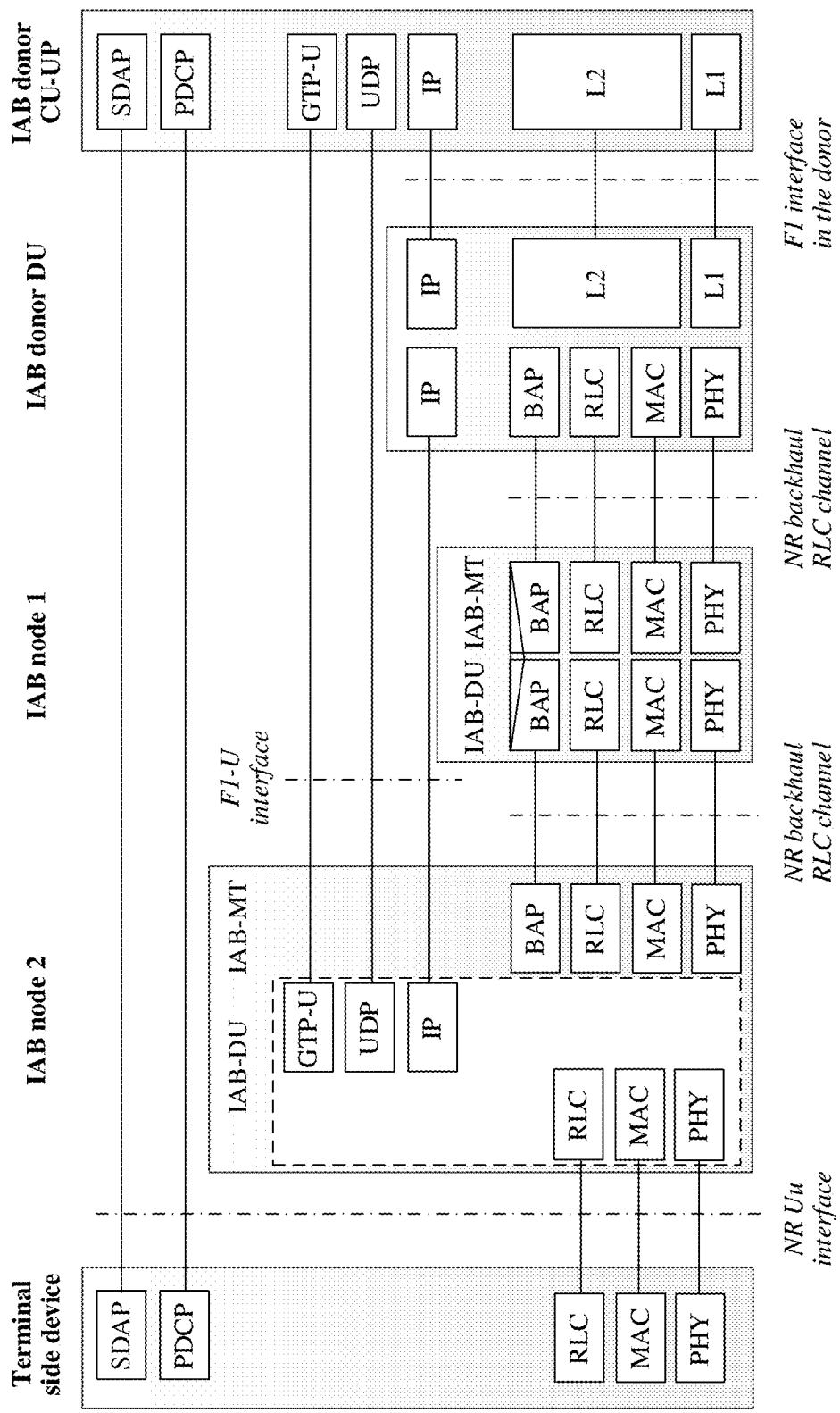
FIG. 3(a) to FIG. 3(d) are a schematic structural diagram of a protocol stack according to an embodiment of this application.

The F1 interface in embodiments of this application supports a user plane protocol and a control plane protocol. For example, FIG. 3(a) is a schematic diagram of a protocol stack of a user plane protocol according to an embodiment of this application. In FIG. 3(a), an example in which a link between a terminal side device and an IAB donor includes a terminal side device, an IAB node 2, an IAB node 1, and an IAB donor is used for description. The IAB donor includes an IAB donor DU (IAB-donor-DU) and an IAB donor CU (IAB-donor-CU). The IAB donor CU includes an IAB donor CU control plane function unit (IAB-donor-CU-CP) and an IAB donor CU user plane function unit (IAB-donor-CU-UP). Because FIG. 3(a) is an example of a user plane protocol stack, only the IAB-donor-CU-UP part is shown. Correspondingly, only the IAB-donor-CU-CP part is shown in a control plane protocol stack in FIG. 3(b).

In FIG. 3(a), peer protocol layers between the terminal side device and the IAB donor include a service data application protocol (Service Data Adaptation Protocol, SDAP) layer and a packet data convergence protocol (packet data convergence protocol, PDCP) layer. Peer protocol layers between the terminal side device and the IAB node 2 include a radio link control (radio link control, RLC) layer, a media access control (media access control, MAC) layer, and a physical (Physical, PHY) layer.

Peer protocols that are between the IAB node 2 and the IAB donor and that are on a user plane of an F1 interface include a general packet radio service (General Packet Radio Service, GPRS) tunneling protocol user plane (GPRS Tunneling Protocol User Plane, GTP-U) layer, a user datagram protocol (user datagram protocol, UDP) layer, and an internet protocol (internet protocol, IP) layer. Optionally, the protocol layers on the user plane of the F1 interface further include a PDCP layer and/or an IP security (IP Security, IPsec for short) layer. In a possible implementation, the IPsec layer or the PDCP layer is located above the IP layer and below the GTP-U layer.

Peer protocol layers between the IAB node 2 and the IAB node 1 include a backhaul adaptation protocol (Backhaul Adaptation Protocol, BAP) layer, an RLC layer, a MAC layer, and a PHY layer. Correspondingly, peer protocols between the IAB node 1 and the IAB donor include a BAP layer, an RLC layer, a MAC layer, and a PHY layer.

Figure 3B:
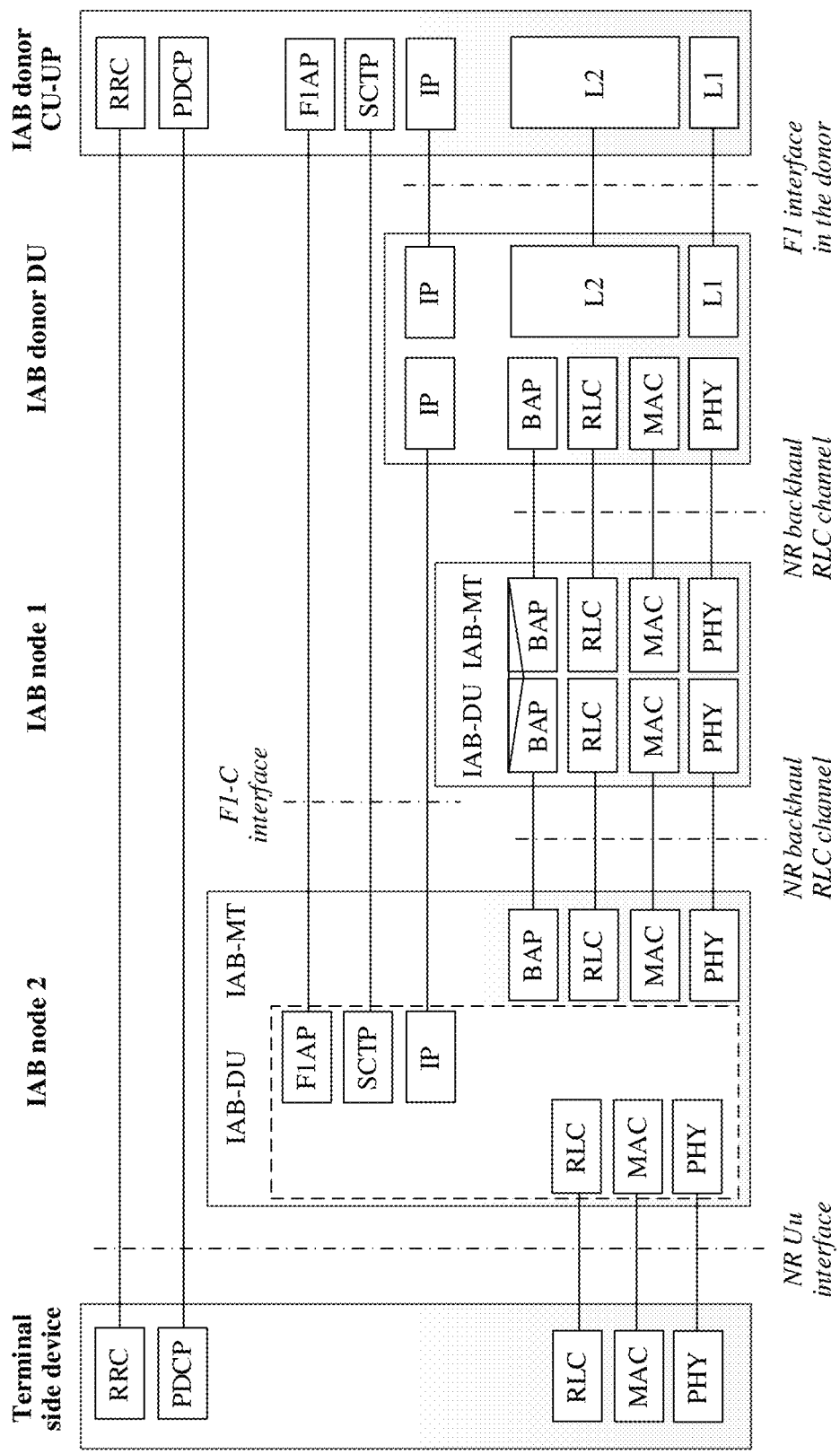

With reference to FIG. 3(a), for example, FIG. 3(b) is a schematic diagram of a protocol stack of a control plane protocol according to an embodiment of this application.

In FIG. 3(b), peer protocols between a terminal side device and an IAB donor include a radio resource control (radio resource control, RRC) layer and a PDCP layer. Peer protocols between the terminal side device and an IAB node 2 include an RLC layer, a MAC layer, and a PHY layer.

Peer protocols that are between the IAB node 2 and the IAB donor and that are on a control plane of an F1 interface include an F1 application protocol (F1 application protocol, F1AP) layer, a stream control transport protocol (stream control transport protocol, SCTP) layer, and an IP layer. Optionally, the protocol layers on the control plane of the F1 interface further include one or more of a PDCP layer, an IPsec layer, and a datagram transport layer security (datagram transport layer security, DTLS for short) layer. In a possible implementation, the IPsec layer, the PDCP layer, or the DTLS layer is located above the IP layer and below the F1AP layer.

Peer protocols between the IAB node 2 and an IAB node 1 include a BAP layer, an RLC layer, a MAC layer, and a PHY layer. Correspondingly, peer protocols between the IAB node 1 and the IAB donor include a BAP layer, an RLC layer, a MAC layer, and a PHY layer.

The BAP layer has at least one of the following capabilities: adding, to a data packet, routing information (Routing information) that can be identified by a radio backhaul node; performing routing selection based on the routing information that can be identified by the radio backhaul node; adding, to the data packet, identification information that can be identified by the radio backhaul node and that is related to a quality of service (quality of service, QoS for short) requirement; performing QoS mapping on a plurality of links including the radio backhaul node for the data packet; adding data packet type indication information to the data packet; sending stream control feedback information to a node having a stream control capability; and sending backhaul link failure indication information to a child node. It should be noted that a name of a protocol layer having these capabilities is not necessarily a BAP layer. A person skilled in the art may understand that any protocol layer having these capabilities may be understood as the BAP layer in embodiments of this application.

The routing information that can be identified by the radio backhaul node may be one or more of information such as an identifier of a terminal, an identifier of an IAB node accessed by the terminal, an identifier of a donor node, an identifier of a Donor-DU, an identifier of a Donor-CU, and an identifier of a transmission path.

The identification information related to a QoS requirement may be a QoS flow identifier (QoS flow identifier, QFI for short) of a terminal, an RB identifier of the terminal, a differentiated services code point (differentiated services code point, DSCP for short), a flow label (flow label) in a header of an IP data packet of internet protocol version 6 (internet protocol version 6, IPv6 for short), some bits (for example, six leftmost bits) in a traffic class (traffic class) field, and the like.

The QoS mapping on a plurality of links may be mapping performed from an RB of a terminal to an RLC bearer or an RLC channel or a logical channel on a radio backhaul link based on mapping identifier information (for example, an identifier of an RB of a terminal, a control plane message type carried in a data packet, or a DSCP in data packet header information, a flow label in IPv6 packet header information, some or all bits in a traffic class field, and a target IP address and/or a GTP tunnel endpoint identifier (Tunnel endpoint identifier, TEID) carried in the data packet, and the like) carried in a data packet in the radio backhaul link; and mapping performed, based on a correspondence between any two or more of an RB, an RLC bearer, an RLC channel and a logical channel on an ingress link and an egress link, from the RB, the RLC bearer, the RLC channel or the logical channel of the ingress link to the RB, the RLC bearer, the RLC channel or the logical channel of the egress link.

The data packet type indication information may be used to indicate that content encapsulated into a BAP layer includes any one or more of the following types: user plane data of a terminal, an RRC message of the terminal, an RRC message of an IAB node, a control layer application message (for example, an F1 AP message) on an interface between the IAB node and a donor node (or a Donor-CU or a CU-CP), a stream control feedback message generated by the IAB node, a header compression feedback message generated by the IAB node, a data PDU of the BAP layer, a control PDU of the BAP layer, and the like.

For example, the node having a stream control capability may be a node providing a backhaul service for an IAB node, and may be, for example, a donor node, a Donor-DU, a Donor-CU, or a parent node of the IAB node. Content of the stream control feedback information may include one or more of the following information: a cache status and a load degree of an IAB node, a status (for example, a link blockage (blockage), link resumption (resume), or link quality information) of a link including the IAB node, a bandwidth and a transmission delay of the link including the IAB node, a sequence number of a data packet lost at the IAB node, a sequence number of a data packet successfully sent by the IAB node to a terminal or a child node of the terminal, and the like.

In addition, in a possible case, a function of the BAP layer may alternatively be extended from a function or functions of any one or more layers (for example, an RLC layer, a MAC layer, and a PDCP layer) included in a layer 2 without any additional protocol layer.

It should be noted that, for functions and effects of the protocol layers described above, refer to descriptions in an existing standard. Details are not described herein again.

It should be noted that the IAB node MT may have a protocol stack of UE. For a communication protocol stack between the IAB node MT and the IAB donor, and a communication protocol stack between the IAB node MT and the parent node, refer to the protocol stacks of UE in FIG. 3(a) and FIG. 3(b) for understanding. In this case, the IAB node may also have an RRC layer, and may establish an RRC connection with the IAB donor, to perform communication based on the RRC layer.

Figure 3C:
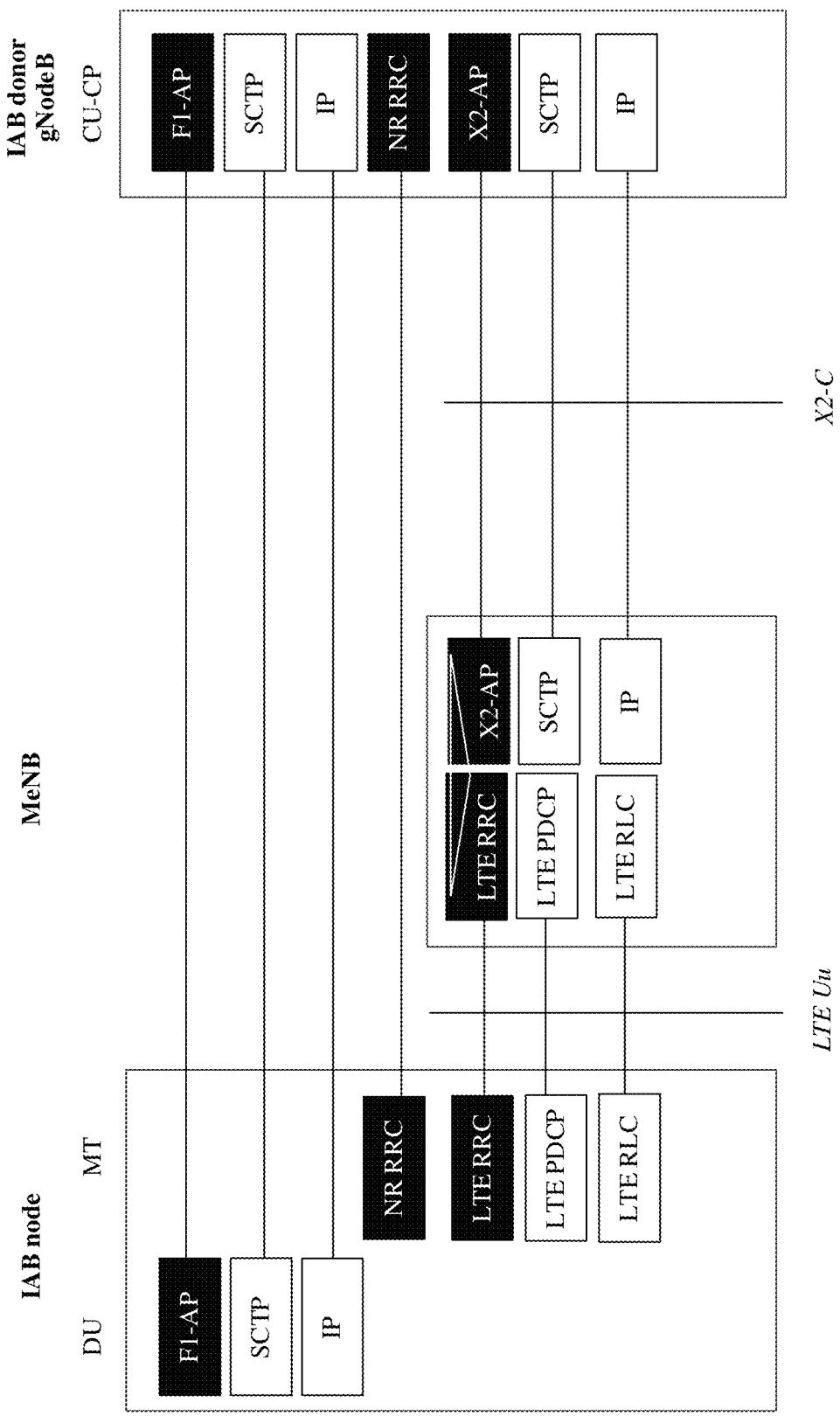

FIG. 3(a) and FIG. 3(b) are exemplary protocol diagrams of standalone networking architectures. For an ENDC networking scenario, for a user plane protocol stack between the IAB node and the IAB donor, refer to FIG. 3(a). There are two forms of a control plane protocol stack. For one form, refer to FIG. 3(b). For another form, refer to the protocol stack diagrams shown in FIG. 3(c) and FIG. 3(d) (in which an F1 AP message is transmitted through an LTE link). The F1 AP message in FIG. 3(c) is first encapsulated in an NR-standard RRC message, and then is transmitted through an LTE air interface and an X2 interface. A difference between FIG. 3(d) and FIG. 3(c) lies in that encapsulation of the NR RRC does not need to be performed.

Figure 3D:
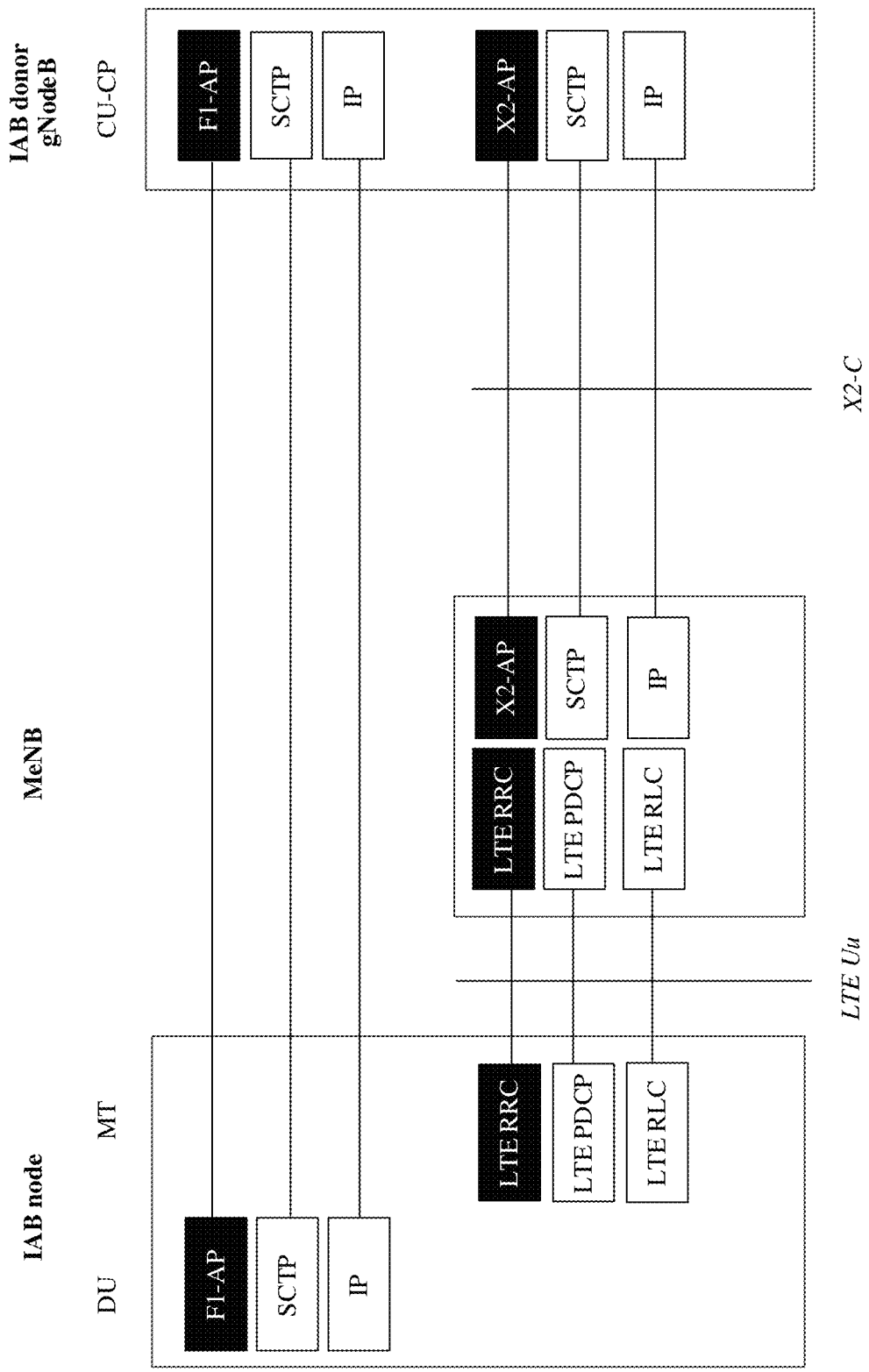

The schematic diagrams of protocol stacks in FIG. 3(c) and FIG. 3(d) are for ease of understanding how to transmit an F1AP message of an IAB node through an X2 interface and an LTE air interface. Actually, the LTE air interface between the IAB node and a MeNB and the X2 interface between the MeNB and the IAB donor further include other protocol layers, which are not shown in the figures. For example, below an RLC layer of the LTE air interface, a peer MAC layer between the IAB node and the MeNB node and a peer PHY layer are further included. The X2 interface further includes a peer link layer (Layer 2, L2) and a peer physical layer (Layer 1, L1) that are connected in a wired manner and that are between the MeNB and the IAB donor. Optionally, the X2 interface may further include a protocol layer used to perform security protection for an X2AP, for example, a DTLS layer, or an IPsec protocol layer is included between the X2AP and an IP layer.

It may be understood that the protocol stack architectures in the IAB networks shown in FIG. 3(a) to FIG. 3(d) in embodiments of this application are merely examples. Methods provided in embodiments of this application do not depend on the examples, but the examples make the methods provided in embodiments of this application easier to understand.

In embodiments of this application, the terminal side device is a device having a radio transceiver function or a chip that can be disposed in the device. The device having the radio transceiver function may also be referred to as user equipment (user equipment, UE), an access terminal, a user unit, a user station, a mobile station, a remote station, a remote terminal, a mobile device, a user terminal, a user agent, or a user apparatus. In actual application, the terminal side device in embodiments of this application may be a mobile phone (mobile phone), a tablet computer (Pad), a computer having a radio transceiver function, a virtual reality (virtual reality, VR) terminal, an augmented reality (augmented reality, AR) terminal, a radio terminal in industrial control (industrial control), a radio terminal in self driving (self driving), a radio terminal in remote medical (remote medical), a radio terminal in a smart grid (smart grid), a radio terminal in transportation safety (transportation safety), a radio terminal in a smart city (smart city), a radio terminal in a smart home (smart home), or the like. An application scenario is not limited in embodiments of this application. In this application, the device having the radio transceiver function and the chip that can be disposed in the device are collectively referred to as the terminal side device.

In embodiments of this application, the network side device may be a radio access device in various standards, for example, an evolved NodeB (evolved NodeB, eNB), a radio network controller (radio network controller, RNC) or a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a radio relay node, a radio backhaul node, a transmission reception point (transmission reception point, TRP or transmission point, TP), or the like. The network side device may alternatively be a gNB or a transmission point (TRP or TP) in a 5G (NR) system, one or one group of antenna panels (including a plurality of antenna panels) of a base station in a 5G system, or may be a network node that constitutes a gNB or a transmission point, for example, a baseband unit (BBU), or may be a DU under a central unit-distributed unit (central unit-distributed unit, CU-DU) architecture.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

In embodiments of this application, an IAB scenario in a radio communication network is used as an example to describe some scenarios. It should be noted that the solutions in embodiments of this application may be further applied to another radio communication network, and a corresponding name may also be replaced with a name of a corresponding function in the another radio communication network.

The communication method provided in embodiments of this application relates to two scenarios: downlink F1 AP message transmission and uplink F1 AP message transmission. The following separately describes the two scenarios.

Scenario 1

In embodiment of this application, in an NSA networking scenario in which both a first radio access device and a second radio access device are connected to a first radio backhaul device, the second radio access device may send a first message to the first radio access device. Because the first message includes a first control plane message and first indication information, the first radio access device may determine a first radio bearer based on the first indication information, and then send a second message including the first control plane message to the first radio backhaul device by using the first radio bearer. The first control plane message may be a control plane message (for example, a downlink F1AP message) on an F1 interface. The first radio bearer may be an SRB (for example, SRB 0, SRB 1, or SRB 2 on an LTE air interface) between the first radio access device and the first radio backhaul device.

That is, the second radio access device may indicate, in the first indication information, radio bearers corresponding to different message types of downlink F1AP messages, so that the first access network device transmits the downlink F1AP message by using the corresponding radio bearer, thereby providing an effective QoS guarantee for a service of a terminal.

In embodiments of this application, the first radio access device and the second radio access device may have different communication standards. For example, the first radio access device may be the master base station (the eNB) in FIG. 2A, the second radio access device may be the secondary base station (the IAB donor gNodeB) in FIG. 2B, and the first radio backhaul device may be the IAB node (or the MT functional entity of the IAB node) in FIG. 2A. In a possible case, if the IAB donor gNodeB is in a CU-DU separation form, the second radio access device may be a CU functional entity in the IAB donor gNodeB. In another possible case, if a CU in the IAB donor gNodeB includes a control plane (CP) functional entity and a user name (UP) functional entity, the second radio access device may be a CU-CP functional entity in the IAB donor gNodeB. If the second radio access device is the secondary base station (the IAB donor gNodeB) in FIG. 2B, the second radio access device may be directly connected to the first radio backhaul device. Alternatively, the second radio access device may be first connected to another radio backhaul device, and then the another radio backhaul device is connected to the first radio backhaul device. That is, the second radio access device supports single-hop or multi-hop connection to the first radio backhaul device. If the second radio access device is the IAB-donor-CU or the IAB-donor-CU-CP, the second radio access device may be connected to the first radio backhaul device by using an IAB-donor-DU, or may be connected to the first radio backhaul device by using the IAB-donor-DU and one or more other radio backhaul devices.

The following provides a description by using an example in which the first radio backhaul device is the IAB node in FIG. 2A, the first radio access device is the eNB in the LTE system in FIG. 2A, and the second radio access device is the IAB donor gNodeB in FIG. 2A. It should be noted that an IAB donor gNodeB in FIG. 4 may be replaced with an IAB-donor-CU or an IAB-donor-CU-CP. Other cases can be deduced by analogy.

Figure 4:
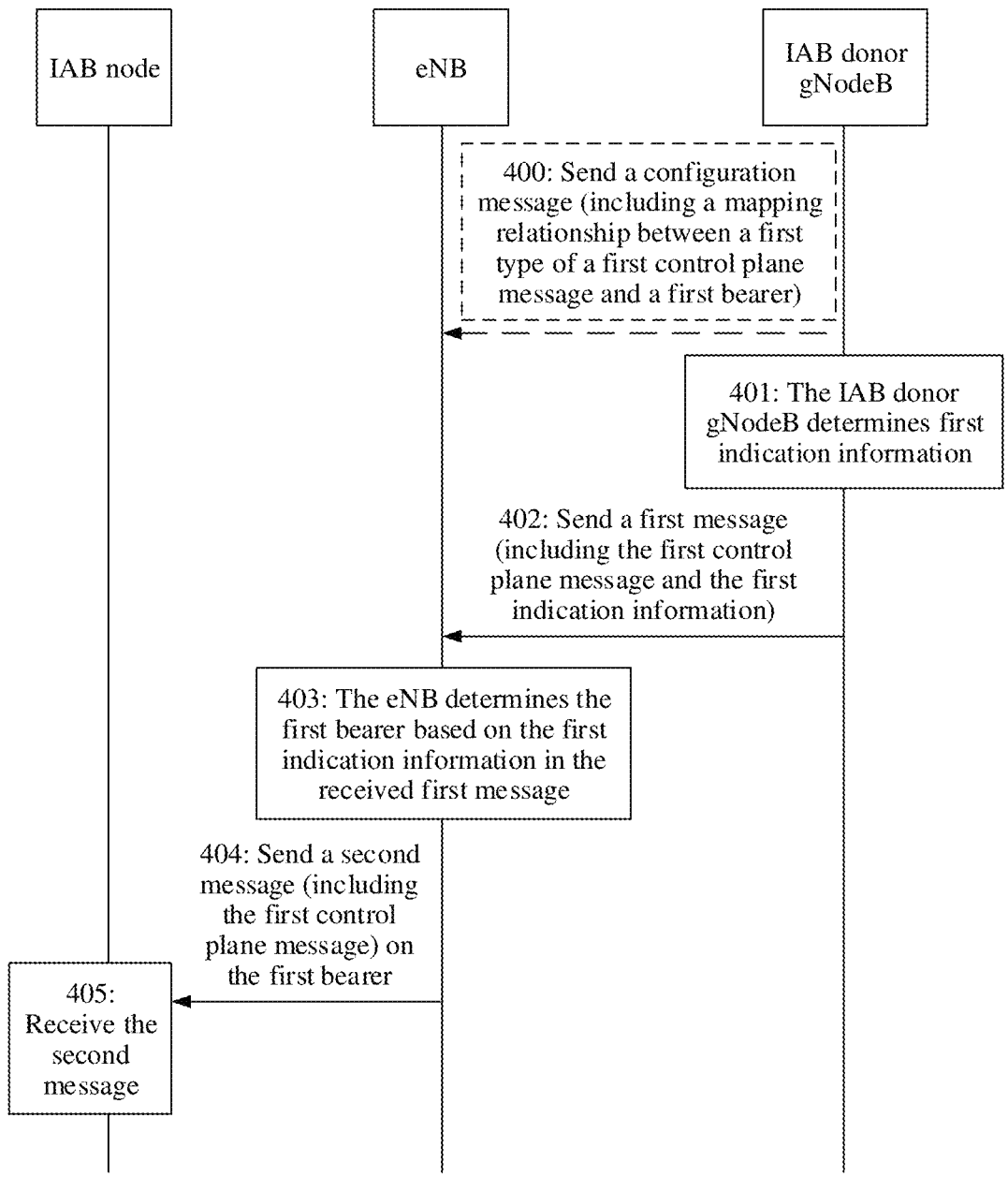
FIG. 4 is a schematic flowchart of a first communication method according to an embodiment of this application.

With reference to the foregoing descriptions, FIG. 4 is a schematic flowchart of a first communication method according to an embodiment of this application. Referring to FIG. 4, the method includes the following steps.

Step 401: The IAB donor gNodeB determines first indication information.

In a possible case, the first indication information may directly indicate an identifier of a first radio bearer. In this way, the eNB may directly determine the first radio bearer based on the identifier of the first radio bearer.

In another possible case, the first indication information may alternatively indicate a first type of a first control plane message. The first control plane message may be a control plane message (for example, a downlink F1AP message) on an F1 interface. The first type of the F1AP message may be a non-UE associated (non-UE associated) message type or a UE associated (UE associated) message type. Optionally, the type of the F1AP message may alternatively indicate an RRC message that is carried in the F1AP message and that is of a child node or UE served by an IAB node. A type of a control plane signaling radio bearer corresponding to the RRC message is SRB 0, SRB 1, or SRB 2. Therefore, the first type of the F1AP message may alternatively be the type of the signaling radio bearer (SRB 0, SRB 1, or SRB 2) corresponding to the RRC message carried in the F1AP message.

In this case, the method further includes step 400: The IAB donor gNodeB needs to send a configuration message to the eNB, where the configuration message includes a mapping relationship between a type of a control plane message and a radio bearer (including a mapping relationship between the first type and the first radio bearer). In this way, the eNB may determine the corresponding first radio bearer based on the first type of the first control plane message by using the mapping relationship.

Step 402: The IAB donor gNodeB sends a first message to the eNB, where the first message includes the first control plane message and the first indication message.

Specifically, the first control plane message may be the downlink F1AP message in the foregoing example, and the first radio bearer may be the SRB (for example, SRB 1, SRB 0, or SRB 2) of the IAB node on an LTE air interface. The IAB donor gNodeB may encapsulate the first indication information and the downlink F1AP message in an X2AP message, and then the IAB donor gNodeB sends the X2AP message to the eNB through an X2 interface. For example, in a possible embodiment, the IAB donor gNodeB may include SCTP protocol header information and IP header information of an F1-C interface in the downlink F1AP message, encapsulate the foregoing information in an NR-standard RRC message of the IAB node, include the NR-standard RRC message in an X2AP message, and send the X2AP message to the eNB. Alternatively, in another possible embodiment, after including SCTP protocol header information and IP header information in the downlink F1AP message, the IAB donor gNodeB may directly include the foregoing information in an X2AP message, and then send the X2AP message to the eNB. That is, in this embodiment, encapsulation of the NR-standard RRC message no longer needs to be performed. The F1-C interface is a control plane of the F1 interface between the IAB donor gNodeB and the IAB node. Protocol layers of the F1-C interface include an F1AP layer, an SCTP layer, and an IP layer. The SCTP protocol header information and the IP header information of the F1-C interface are respectively SCTP protocol layer header information of the F1-C interface and IP layer header information of the F1-C interface. It should be noted that, in this application, when the IAB donor gNodeB sends the X2AP message to the eNB, the X2AP message is sent after being processed by each layer of an X2 control plane (X2-C) protocol stack. Refer to current sending of an X2AP message. Details are not described again.

Step 403: The eNB determines the first radio bearer based on the first indication information in the received first message.

Specifically, after receiving the X2AP message carrying the downlink F1AP message, the eNB needs to determine a corresponding radio bearer. There are a plurality of manners of determining the radio bearer. In a possible embodiment, if the first indication information indicates the identifier of the first radio bearer, the eNB may directly determine the first radio bearer based on the identifier of the first radio bearer. In another possible embodiment, if the first indication information is the first type of the first control plane message, the eNB may determine the corresponding first radio bearer based on the first type of the first control plane message by using the mapping relationship.

Step 404: The eNB sends a second message to the IAB node by using the first radio bearer, where the second message includes the first control plane message.

Specifically, the eNB may encapsulate the downlink F1AP message in an LTE-standard RRC message, and send the RRC message to the IAB node (which may be specifically an MT of the IAB node) by using the first radio bearer of an LTE link.

The LTE-standard RRC message sent by the eNB to the IAB node may carry the downlink F1AP message including the SCTP header information and the IP header information of the F1-C interface. Alternatively, the LTE-standard RRC message sent by the eNB to the IAB node (which may be specifically the MT of the IAB node) may carry the NR-standard RRC message of the IAB node, and the NR-standard RRC message carries the downlink F1AP message including the SCTP header information and the IP header information of the F1-C interface.

Step 405: The IAB node receives the second message.

Specifically, the IAB node may receive the RRC message sent by the eNB, and then obtain the downlink F1AP message from the RRC message.

In this embodiment of this application, in an IAB non-standalone networking architecture, if the downlink F1 AP message is transmitted through the LTE air interface, the eNB needs to obtain the downlink F1AP message and the first indication information from the IAB node, and determine the first radio bearer based on the first indication information. Because the first radio bearer corresponds to the type of the downlink F1 AP message, the eNB can select different SRBs for different types of downlink F1AP messages, thereby providing an effective QoS guarantee for a service of a terminal.

Scenario 2

In embodiments of this application, in an NSA networking scenario in which both a first radio access device and a second radio access device are connected to a first radio backhaul device, the first radio access device or the second radio access device may send a configuration message to the first radio backhaul device, where the configuration message may include a correspondence between a radio bearer and a type of a control plane message (for example, including a correspondence between a first radio bearer and a first type of the control plane message). After receiving the configuration message, the first radio backhaul device may determine the first radio bearer used for sending a second control plane message of the first type, and then the first radio backhaul device sends a third message including the second control plane message to the first radio access device by using the first radio bearer, so that the first radio access device sends the second control plane message to the second radio access device. The second control plane message may be a control plane message on an F1 interface (for example, an uplink F1AP message on an F1-C interface between the first radio backhaul device and the second radio access device). The first radio bearer is a radio bearer on a link between the first radio backhaul device and the first radio access device.

That is, the first radio backhaul device may determine, based on the configuration information, the first radio bearer corresponding to a to-be-sent uplink F1 AP message, then send the second control plane message to the first radio access device on the first radio bearer, and the first radio access device forwards the second control plane message to the second radio access device. In this way, the first radio backhaul device selects different radio bearers when transmitting different types of F1 AP messages through an air interface between the first radio backhaul device and the first radio access device, thereby providing an effective QoS guarantee for a service of a terminal connected to the first radio backhaul device.

In embodiments of this application, the first radio access device and the second radio access device may have different communication standards. For example, the first radio access device may be the master base station (the eNB) in FIG. 2A, the second radio access device may be the secondary base station (the IAB donor gNodeB) in FIG. 2B, and the first radio backhaul device may be the IAB node in FIG. 2A. In a possible case, if the IAB donor gNodeB is in a CU-DU separation form, the second radio access device may be a CU functional entity in the IAB donor gNodeB. In another possible case, if a CU in the IAB donor gNodeB includes a control plane (CP) functional entity and a user name (UP) functional entity, the second radio access device may be a CU-CP functional entity in the IAB donor gNodeB. If the second radio access device may be the secondary base station (the IAB donor gNodeB) in FIG. 2B, the second radio access device may be directly connected to the first radio backhaul device. Alternatively, the second radio access device may be first connected to another radio backhaul device, and then the another radio backhaul device is connected to the first radio backhaul device. That is, the second radio access device supports single-hop or multi-hop connection to the first radio backhaul device. If the second radio access device is the IAB-donor-CU or the IAB-donor-CU-CP, the second radio access device may be connected to the first radio backhaul device by using an IAB-donor-DU, or may be connected to the first radio backhaul device by using the IAB-donor-DU and one or more other radio backhaul devices.

The following provides a description by using an example in which the first radio backhaul device is the IAB node in FIG. 2A, the first radio access device is the eNB in the LTE system in FIG. 2A, and the second radio access device is the IAB donor gNodeB in FIG. 2A. Other cases can be deduced by analogy.

Figure 5:
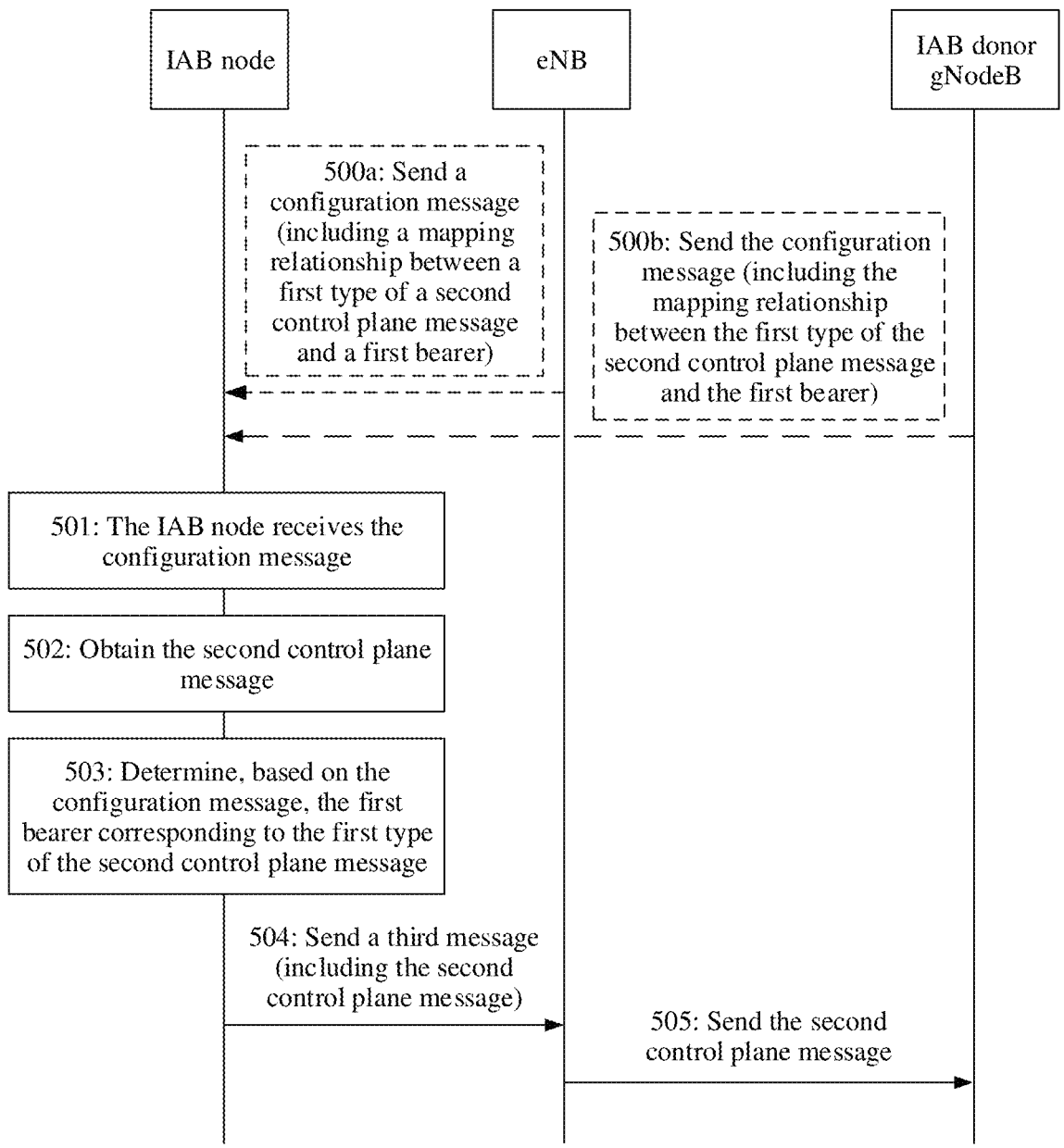
FIG. 5 is a schematic flowchart of a second communication method according to an embodiment of this application.

With reference to the foregoing descriptions, FIG. 5 is a schematic flowchart of a second communication method according to an embodiment of this application. Referring to FIG. 5, the method includes the following steps.

Step 501: The IAB node receives a configuration message.

The configuration message includes a correspondence between a radio bearer and a type of a control plane message, for example, includes a correspondence between a first radio bearer and a first type of the control plane message. The radio bearer in the configuration relationship may be an SRB (for example, SRB 1, SRB 0, or SRB 2) of an LTE air interface. A second control plane message may be a control plane message (for example, an uplink F1AP message) on an F1 interface between the IAB node and an IAB donor gNodeB. The configuration message may be received from the IAB donor gNodeB or the eNB.

A type of an F1AP message may be a non-UE associated (non-UE associated) message type or a UE associated (UE associated) message type. Optionally, the type of the F1 AP message may alternatively include an RRC message that is carried in the F1 AP message and that is of a child node or a terminal served by the IAB node. A type of a control plane signaling radio bearer corresponding to the RRC message is SRB 0, SRB 1, or SRB 2. Therefore, the first type of the F1AP message may alternatively be the type of the signaling radio bearer (SRB 0, SRB 1, or SRB 2) corresponding to the RRC message carried in the F1AP message.

In a possible embodiment, the IAB node may receive the configuration message from the IAB donor gNodeB. In this case, the method further includes step 500*a*: The IAB donor gNodeB sends the configuration information to the IAB node. The configuration information may be carried in an RRC message (the RRC message is an NR-standard RRC message) sent by the IAB donor gNodeB to the IAB node (which may be specifically an MT functional entity of the IAB node). Alternatively, the configuration information may be carried in an F1AP message sent by the IAB donor gNodeB to the IAB node (which may be specifically a DU functional entity of the IAB node).

In another possible embodiment, the IAB node may receive the configuration message from the eNB. In this case, the method further includes step 500*b*: The eNB sends the configuration information to the IAB node. The configuration information may be carried in an RRC message (the RRC message is an LTE-standard RRC message) sent by the eNB to the IAB node (which may be specifically an MT functional entity of the IAB node). Optionally, before sending the configuration message to the IAB node, the eNB may obtain the configuration message from the IAB donor gNodeB.

Step 502: The IAB node obtains the second control plane message, where a type of the second control plane message is the first type.

The second control plane message may be an uplink F1 AP message. In a possible embodiment, the IAB node may generate the uplink F1AP message. The IAB node may determine that a type of the F1AP message is the first type.

Step 503: The IAB node determines, based on the configuration message, the first radio bearer corresponding to the first type of the second control plane message.

That is, when sending the uplink F1 AP message, the IAB node may determine, by using the mapping relationship in the configuration message, the SRB of the LTE air interface used to transmit the F1AP message.

Step 504: The IAB node sends a third message to the eNB by using the first radio bearer, where the third message includes the second control plane message.

In this embodiment of this application, after processing the F1AP message at an SCTP protocol layer and an IP layer of an F1-C interface, the IAB node encapsulates the F1AP message in an RRC message, and sends the RRC message to the eNB through the LTE air interface, so that the eNB forwards the RRC message.

Step 505: The eNB receives the third message, and sends the second control plane message to the IAB donor gNodeB.

Because the third message carries a destination IP address (for example, a first destination IP address), the eNB may determine the IAB donor gNodeB based on the destination IP address, and then send the second control plane message (that is, the uplink F1AP message of the IAB node) to the IAB donor gNodeB through an X2 interface.

In a possible embodiment, when the IAB node sends the uplink F1AP message, the uplink F1AP message may be transmitted through the LTE air interface (that is, the F1AP message is encapsulated in the LTE-standard RRC message, sent to the eNB through the LTE air interface, and then forwarded by the eNB to the IAB donor), or may be transmitted through an NR air interface (that is, the F1AP message is sent to the IAB donor through an NR backhaul link). Therefore, the IAB node further needs to determine an air interface through which the uplink F1AP message is to be transmitted. Therefore, the IAB donor gNodeB configures at least two different IP addresses for the IAB node. The IP address may be a source IP address used when the IAB node sends the uplink F1AP message, or the destination IP address (that is, an IP address of the IAB donor gNodeB) used when the IAB node sends the uplink F1AP message. The IAB donor gNodeB configures, for the IAB node, correspondences between the different IP addresses (which may be the source IP address and/or the destination IP address used when the IAB node sends the F1AP message) and different air interfaces (the LTE air interface or the NR air interface). In this way, when sending the uplink F1 AP message, the IAB node may select different IP addresses (including the source IP address and/or the destination IP address), and then determine, based on the different IP addresses, whether to encapsulate the F1AP message in the RRC message and send the RRC message through the LTE air interface, or send the F1AP message through the NR backhaul link. Optionally, before delivering, to a lower layer, an IP data packet in which the uplink F1AP message is encapsulated, the IAB node may determine, based on the source IP address and/or the target IP address carried in the data packet, whether a lower-layer protocol layer is an RRC layer of the LTE air interface or a BAP layer of the NR backhaul link.

The IAB donor gNodeB may send an RRC message to the IAB node (which may be specifically an MT of the IAB node), or send an F1AP message to the IAB node (which may be specifically a DU of the IAB node). The RRC message or the F1AP message carries correspondences between different IP addresses and different air interfaces. For example, IP address 1 corresponds to an LTE air interface, and IP address 2 corresponds to an NR air interface. IP address 1 and IP address 2 are source IP addresses or destination IP addresses used when the IAB node sends the uplink F1AP message. Alternatively, IP address 1 and IP address 2 correspond to an LTE air interface, and IP address 3 and IP address 4 correspond to an NR air interface. IP address 1 and IP address 3 are source IP addresses (that is, IP addresses of the IAB node) used when the IAB node sends the uplink F1AP message. IP address 2 and IP address 4 are destination IP addresses (that is, IP addresses of the IAB donor gNodeB) used when the IAB node sends the uplink F1AP message.

For example, the IAB donor gNodeB configures an IP address: IP address 1 for the IAB node. IP address 1 corresponds to an LTE air interface (or indicates that a lower-layer protocol layer corresponding to the F1AP message is LTE RRC layer). The IAB donor gNodeB configures an IP address: IP address 2 for the IAB node. The IP address 2 corresponds to an NR air interface (or indicates that a lower-layer protocol layer corresponding to the F1AP message is a backhaul adaptation protocol (backhaul adaptation protocol, BAP) layer). IP address 1 and IP address 2 may be an IP address of the IAB node or an IP address of the IAB donor gNodeB. When the NR backhaul link between the IAB node and the IAB donor gNodeB is normal, the IAB node uses IP address 2 when sending the uplink F1AP message, and selects a corresponding NR backhaul link for transmission. When the NR backhaul link between the IAB node and the IAB donor gNodeB is unavailable (for example, a radio link failure or a blockage occurs on at least one segment of the radio backhaul link), the IAB node uses IP address 1 when sending the uplink F1AP message, and selects a corresponding LTE link for transmission. Therefore, the IAB node may configure different IP addresses for uplink F1 AP messages transmitted on different paths, to facilitate route selection.

For another example, the IAB donor gNodeB may configure a first pair of addresses (a destination address IP address 2 and a source address IP address 1) and a second pair of addresses (a destination address IP address 4 and a source address IP address 3) for the IAB node. Based on the foregoing correspondence, the IP address 2 may correspond to an LTE air interface (or it indicates that a lower-layer protocol layer corresponding to the F1 AP message is LTE RRC layer), and the IP address 4 corresponds to an NR air interface. When the NR backhaul link between the IAB node and the IAB donor gNodeB is normal, the IAB node uses the second pair of addresses when sending the uplink F1 AP message, and selects a corresponding NR backhaul link for transmission. When the NR backhaul link between the IAB node and the IAB donor gNodeB is unavailable (for example, a radio link failure or blockage occurs on at least one segment of the radio backhaul link), the IAB node uses the first pair of addresses when sending the uplink F1AP message, and selects a corresponding LTE link for transmission. Therefore, the IAB node may configure different IP addresses for uplink F1AP messages transmitted on different paths, to facilitate route selection.

In this embodiment of this application, for the uplink F1 AP message, that is, for the F1AP message sent by the IAB node to the IAB donor gNodeB, when the IAB node needs to transmit the F1 AP message through the LTE air interface, the IAB node needs to determine the SRB of the LTE air interface based on the configuration information. The IAB node encapsulates different F1AP messages in different LTE SRBs, so that when the F1AP message of the IAB node is transmitted through the LTE air interface, types of the F1 AP messages are different, and the eNB determines that SRBs on the LTE air interface between the IAB node and the eNB are also different, thereby providing different QoS guarantees.

Figure 6:
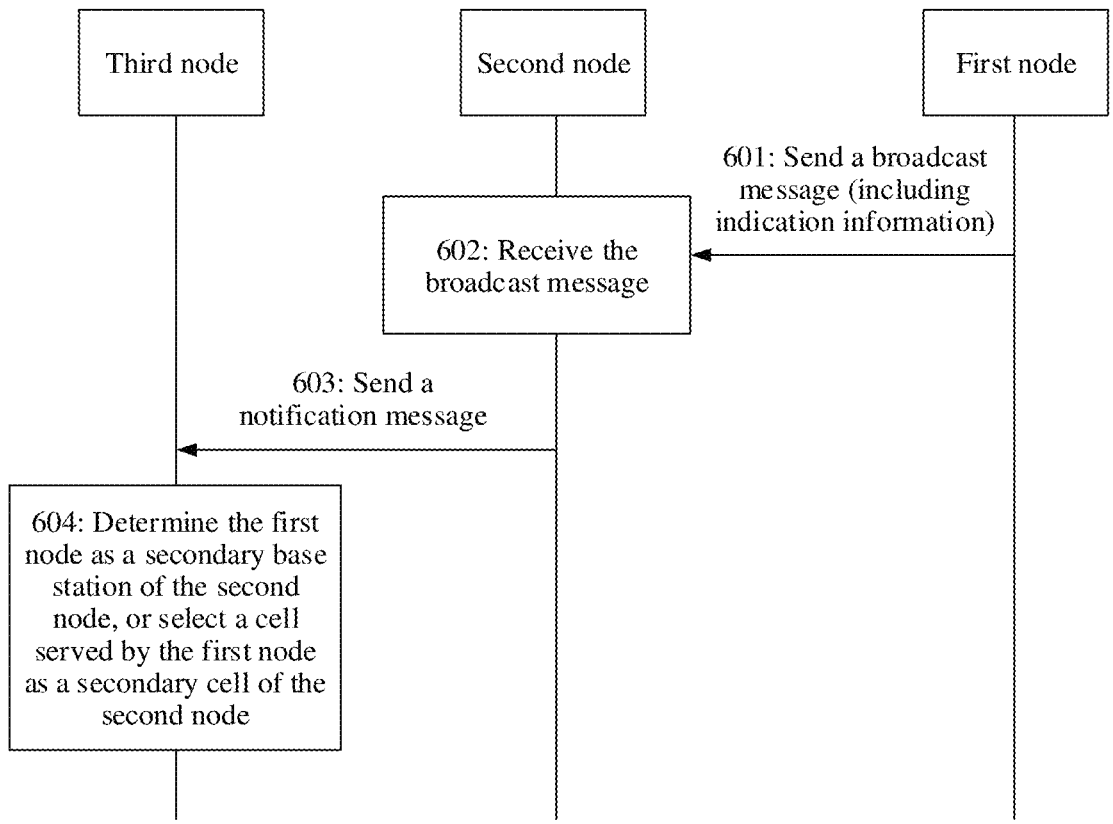
FIG. 6 is a schematic flowchart of another communication method according to an embodiment of this application.

For an IAB network, this application further provides a communication method. The method is used for a master base station (or referred to as a master node) of an IAB node to select an appropriate secondary base station (or referred to as a secondary node) for the IAB node. As shown in FIG. 6, the method includes the following steps.

Step 601: A first node sends a broadcast message, where the broadcast message includes indication information, and the indication information is used to indicate that the first node is capable of supporting access of the IAB node.

Specifically, the first node may be an IAB donor gNodeB (which may be specifically an IAB donor DU) or a first IAB node. The first node may include the indication information in system information (system information, SI) of a cell served by the first node. For example, the first node includes the indication information in a system information block (System Information Block, SIB) 1 sent by the first node.

Step 602: A second node receives the broadcast message, and obtains the indication information from the broadcast message.

That is, the second node reads the indication information sent by the first node, and determines that the first node supports access of the IAB node.

The second node is a second IAB node, the second node accesses a cell (that is, a primary cell that provides an access service for the second node) served by a third node, and the third node is a primary base station of the second node. For example, the third node may be an LTE-standard eNB.

Step 603: The second node sends a notification message to the third node, where the notification message includes the indication information indicating that the first node or the cell served by the first node supports access of the IAB node. Optionally, the notification message may further include a result of measuring, by the second node, the cell served by the first node.

Step 604: The third node determines that the first node is a secondary base station of the second node, or selects the cell served by the first node as a secondary cell of the second node.

Specifically, the third node selects the first node as the secondary base station of the second node based on the notification message received in step 603. If the first node is the first IAB node, the third node selects an IAB donor gNodeB accessed by the first IAB node as the secondary base station of the second node, and selects the first IAB node as a parent node of the second node under the IAB donor gNodeB. If the first node is the IAB donor gNodeB, the third node selects the IAB donor gNodeB as the secondary base station of the second node.

In a subsequent step, the third node adds the secondary base station for the second node. For a specific step, refer to the current technology. Details are not described in this embodiment of this application.

Based on this embodiment provided by this application, a primary serving base station of the IAB node may select, for the IAB node, a secondary base station supporting access of the IAB node, to avoid a case in which the IAB node is not capable of providing a backhaul service for UE by using a secondary cell because a selected secondary base station is not capable of supporting access of the IAB node.

In the foregoing embodiments provided in this application, the methods provided in embodiments of this application are separately described from a perspective of interaction between devices. To implement functions in the foregoing methods provided in embodiments of this application, the first radio backhaul device, the first radio access device, and the second radio access device may include a hardware structure and/or a software module, and implement the foregoing functions in a form of the hardware structure, the software module, or a combination of the hardware structure and the software module. Whether one of the foregoing functions is performed in the manner of a hardware structure, a software module, or a hardware structure and a software module depends on a specific application and design constraints of the technical solutions.

Figure 7:
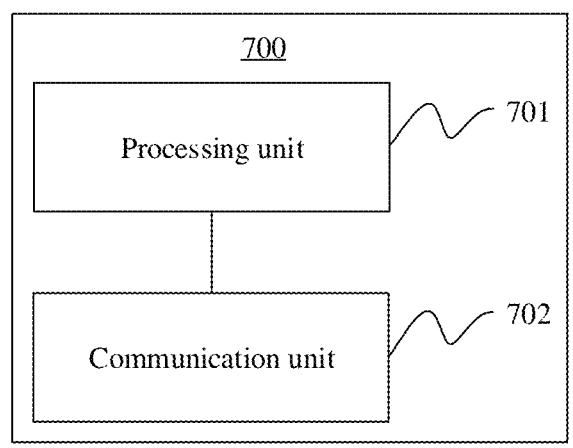
FIG. 7 is a schematic structural diagram of a communication apparatus according to an embodiment of this application.

Same as the foregoing concept, as shown in FIG. 7, an embodiment of this application further provides an apparatus 700, configured to implement function of the first radio access device (for example, the eNB) or the second radio access device (for example, the IAB donor gNodeB) in the foregoing methods. For example, the apparatus may be a software module or a chip system. In this embodiment of this application, the chip system may include a chip, or may include a chip and another discrete device. The apparatus 700 may include a processing unit 701 and a communication unit 702.

In this embodiment of this application, module division is an example and is merely logical function division, and may be other division in actual implementation. In addition, functional modules in this embodiment of this application may be integrated into one processor, or each of the modules may exist alone physically, or two or more modules are integrated into one module. The integrated module may be implemented in a form of hardware, or may be implemented in a form of a software functional module.

For example, when the apparatus 700 implements the function of the first radio access device in the procedure shown in FIG. 4, the communication unit 702 is configured to receive a first message from a second radio access device, where the first message includes a first control plane message and first indication information; and the processing unit 701 is configured to determine a first radio bearer based on the first indication information.

The communication unit 702 is further configured to send a second message to a first radio backhaul device by using the first radio bearer, where the second message includes the first control plane message.

In a possible design, the first indication information may directly indicate an identifier of the first radio bearer. In this way, the processing unit 701 may directly determine the first radio bearer based on the identifier of the first radio bearer.

In a possible design, the first indication information may alternatively indicate a first type of the first control plane message. The communication unit 702 is further configured to send a configuration message to the first radio backhaul device, where the configuration message includes a mapping relationship between a type of a control plane message and a radio bearer. In this way, the processing unit 701 may determine the corresponding first radio bearer based on the first type of the first control plane message by using the mapping relationship.

For example, when the apparatus 700 implements the function of the second radio access device in the procedure shown in FIG. 4, the processing unit 701 is configured to determine first indication information; and the communication unit 702 is configured to send a first message including the first indication information to a first radio access device, where the first indication information is used to determine a first radio bearer corresponding to a first control plane message transmitted between the first radio access device and a first radio backhaul device.

In a possible design, the first indication information is used to indicate an identifier of the first radio bearer.

In a possible design, the first indication information may alternatively indicate a first type of the first control plane message.

In a possible design, when the first indication information indicates the first type of the first control plane message, the communication unit 702 is further configured to send a configuration message to the first radio access device, where the configuration message includes a mapping relationship between the first type of the first control plane message and the first radio bearer, and the configuration message is used to determine the first radio bearer corresponding to the first type of the first control plane message.

The first control plane message is an F1AP message on an F1 interface.

For example, when the apparatus 700 implements the function of the first radio backhaul device in the procedure shown in FIG. 5, the communication unit 702 is configured to receive a configuration message, where the configuration message includes a correspondence between a first radio bearer and a first type of a control plane message; and the processing unit 701 is configured to obtain the second control plane message, and determine, based on the configuration message, the first radio bearer corresponding to the first type of the second control plane message.

The communication unit 702 is further configured to send a third message to a first radio access device by using the first radio bearer, where the third message includes the second control plane message.

In a possible design, the communication unit 702 may receive the configuration message from the first radio access device or a second radio access device.

In a possible design, the communication unit 702 may receive a fifth message from the first radio access device, where the fifth message includes a mapping relationship between a first IP address and a first air interface; and the communication unit 702 determines the first air interface corresponding to the first IP address in the second control plane message, and then determines, based on the configuration message, the first radio bearer that is on the first air interface and that is corresponding to the first type of the second control plane message.

The second control plane message is an F1AP message on an F1 interface, and is an F1AP message sent by the first radio backhaul device to the second radio access device.

For example, when the apparatus 700 implements the function of the first radio access device in the procedure shown in FIG. 5,
the communication unit 702 is configured to receive a third message from a first radio backhaul device by using a first radio bearer, where the third message includes a second control plane message; and
the processing unit 701 is configured to determine a second radio access device corresponding to a destination IP address in the second control plane message in the third message.

The communication unit 702 is configured to send a fourth message to the second radio access device, where the fourth message includes the second control plane message.

In a possible design, the communication unit 702 is further configured to, before receiving the third message, send a configuration message to the first radio backhaul device, where the configuration message includes a correspondence between the first radio bearer and a first type of the control plane message, so that the first radio backhaul device determines the first radio bearer corresponding to the first type of the second control plane message.

In a possible design, the communication unit 702 is further configured to receive a configuration message from the second radio access device.

For example, when the apparatus 700 implements the function of the second radio access device in the procedure shown in FIG. 5,
the processing unit 701 is configured to generate a configuration message, where the configuration message includes a mapping relationship between a first radio bearer and a first type of a control plane message; and
the communication unit 702 is configured to send the configuration message to a first radio backhaul device, where the configuration message is used by the first radio backhaul device to determine the first radio bearer corresponding to the first type of the second control plane message; or
the communication unit 702 is configured to send the configuration message to a first radio access device, where the configuration message is used to determine the first radio bearer corresponding to the second control plane message transmitted between the first radio access device and a first radio backhaul device.

For example, when the apparatus 700 implements the function of the third node in the procedure shown in FIG. 6,
the communication unit 702 is configured to receive a notification message, where the notification message includes indication information indicating that a first node or a cell served by the first node supports access of an IAB node. Optionally, the notification message may further include a result of measuring, by the second node, the cell served by the first node.

The processing unit 701 is configured to determine that the first node is a secondary base station of the second node, or select the cell served by the first node as a secondary cell of the second node.

For example, when the apparatus 700 implements the function of the first node in the procedure shown in FIG. 6,
the communication unit 702 is configured to send a broadcast message, where the broadcast message includes indication information, and the indication information is used to indicate that the first node is capable of supporting access of an IAB node.

For example, when the apparatus 700 implements the function of the second node in the procedure shown in FIG. 6,
the communication unit 702 is configured to receive a broadcast message, and obtain indication information from the broadcast message.

The communication unit 702 is further configured to send a notification message to a third node, where the notification message includes indication information indicating that the first node or a cell served by the first node supports access of an IAB node. Optionally, the notification message may further include a result of measuring, by the second node, the cell served by the first node.

Figure 8:
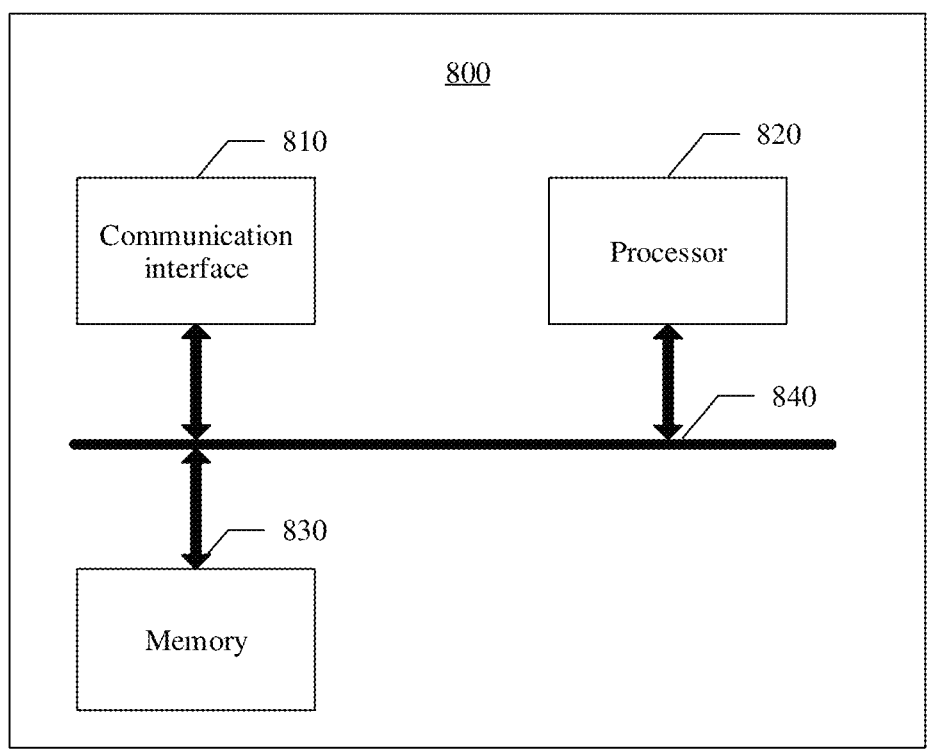
FIG. 8 is a schematic structural diagram of a communication apparatus according to an embodiment of this application.

FIG. 8 shows an apparatus 800 according to an embodiment of this application. The apparatus shown in FIG. 8 may be implemented by a hardware circuit of the apparatus shown in FIG. 7. The communication apparatus is applicable to the flowcharts shown in FIG. 4 and FIG. 5, and performs the function of the first radio access device, the second radio access device, or the first radio backhaul device in the foregoing method embodiments. For ease of description, FIG. 8 shows only main components of the communication apparatus.

The apparatus 800 shown in FIG. 8 includes at least one processor 820, configured to implement any method in FIG. 4 to FIG. 6 provided in embodiments of this application.

The apparatus 800 may further include at least one memory 830, configured to store program instructions and/or data. The memory 830 is coupled to the processor 820. Couplings in this embodiment of this application are indirect couplings or communication connections between apparatuses, units, or modules, may be electrical, mechanical, or in another form, and are used for information exchange between the apparatuses, the units, or the modules. The processor 820 may operate in collaboration with the memory 830. The processor 820 may execute the program instructions stored in the memory 830. At least one of the at least one memory may be included in the processor.

The apparatus 800 may further include a communication interface 810, configured to communicate with another device through a transmission medium, so that an apparatus in the apparatus 800 can communicate with the another device. In this embodiment of this application, the communication interface may be a transceiver, a circuit, a bus, a module, or a communication interface of another type. In this embodiment of this application, the transceiver may be an independent receiver, an independent transmitter, a transceiver with an integrated receiving and sending function, or an interface circuit. The processor 820 receives and sends data by using the communication interface 810, and is configured to implement the method performed by the first radio access device, the second radio access device, or the first radio backhaul device in embodiments corresponding to FIG. 4 to FIG. 6. For details, refer to the foregoing descriptions. Details are not described herein again.

Based on the same concept as the foregoing method embodiments, an embodiment of this application further provides a computer-readable storage medium. The computer-readable storage medium stores some instructions. When these instructions are invoked and executed by a computer, the computer is enabled to perform the method in the foregoing method embodiments and any possible design of the foregoing method embodiments. In this embodiment of this application, the computer-readable storage medium is not limited. For example, the computer-readable storage medium may be a RAM (random-access memory, random-access memory) or a ROM (read-only memory, read-only memory).

Based on a same concept as the foregoing method embodiments, this application further provides a computer program product. When being invoked and executed by a computer, the computer program product can perform the method in the foregoing method embodiments and any possible design of the foregoing method embodiments.

Based on a same concept as the foregoing method embodiments, this application further provides a chip. The chip may include a processor and an interface circuit, to complete the method in the foregoing method embodiments and any possible implementation of the foregoing method embodiments. "Coupling" means that two components are directly or indirectly combined with each other. The combination may be fixed or movable, and the combination may allow communication of fluid, electricity, an electrical signal, or another type of signal between two components.

A person skilled in the art should understand that embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can indicate a computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communication method, comprising:
   receiving, by a first radio access device, a first message from a second radio access device, wherein the first message comprises:
      a first control plane message for an interface between a first radio backhaul device and the second radio access device, and
      first indication information which indicates a first type of the first control plane message;
   receiving, by the first radio access device, a configuration message from the second radio access device, wherein the configuration message comprises a mapping relationship between
      different types of control plane messages for the interface between the first radio backhaul device and the second radio access device, wherein the different types of control plane messages include the first type of the first control plane message, and
      corresponding different radio bearers for communication from the first radio access device to the first radio backhaul device;
   determining, by the first radio access device and among the different radio bearers, a first radio bearer corresponding to the first type of the first control plane message based on
      the first type of the first control plane message included in the first indication information, and
      the mapping relationship included in the configuration message; and
   sending, by the first radio access device, a second message to the first radio backhaul device by using the first radio bearer, wherein the second message comprises the first control plane message,
   wherein both the first radio access device and the second radio access device are connected to the first radio backhaul device.

2. The method according to claim 1, wherein the first radio bearer is a signaling radio bearer (SRB) between the first radio backhaul device and the first radio access device.

3. The method according to claim 1, wherein
   the first control plane message is an F1 application protocol (AP) message on an F1 interface, and
   the F1 interface is the interface between the first radio backhaul device and the second radio access device.

4. The method according to claim 1, wherein the first radio access device and the second radio access device have different communication standards.

5. The method according to claim 3, wherein
   the first radio access device is a base station in a long term evolution (LTE) system,
   the second radio access device is an integrated access and backhaul (IAB) donor (gNodeB), and
   the first radio backhaul device is an IAB node.

6. A communication method, comprising:
   determining, by a second radio access device, first indication information;
   sending, by the second radio access device, a first message to a first radio access device, wherein the first message comprises:
   a first control plane message for an interface between a first radio backhaul device and the second radio access device, and
   the first indication information indicating a first type of the first control plane message to be used by the first radio access device to determine a first radio bearer for sending the first control plane message from the first radio access device to the first radio backhaul device; and
   sending, by the second radio access device, a configuration message to the first radio access device, wherein the configuration message comprises a mapping relationship between
   different types of control plane messages for the interface between the first radio backhaul device and the second radio access device, and
   corresponding different radio bearers for communication from the first radio access device to the first radio backhaul device,
   wherein
   the different types of control plane messages include the first type of the first control plane message,
   the mapping relationship enables the first radio access device to determine, among the different radio bearers, the first radio bearer which corresponds to the first type of the first control plane message, based on the first type of the first control plane message included in the first indication information and the mapping relationship included in the configuration message, and
   both the first radio access device and the second radio access device are connected to the first radio backhaul device.

7. The method according to claim 6, wherein the first radio bearer is a signaling radio bearer SRB between the first radio backhaul device and the first radio access device.

8. The method according to claim 6, wherein the first control plane message is an F1 application protocol (AP) message on an F1 interface, and
   the F1 interface is the interface between the first radio backhaul device and the second radio access device.

9. The method according to claim 6, wherein the first radio access device and the second radio access device have different communication standards.

10. The method according to claim 6, wherein
    the first radio access device is a base station in a long term evolution (LTE) system,
    the second radio access device is an integrated access and backhaul (IAB) donor (gNodeB), and
    the first radio backhaul device is an IAB node.

11. A communication method, comprising:
    receiving, by a first radio backhaul device, a configuration message from a first radio access device or a second radio access device, wherein the configuration message comprises a mapping relationship between
    different types of control plane messages for an interface between the first radio backhaul device and the second radio access device, and
    corresponding different radio bearers for communication from the first radio access device to the first radio backhaul device;
    obtaining, by the first radio backhaul device, a control plane message for the interface between the first radio backhaul device and the second radio access device;
    selecting, by the first radio backhaul device and among the different radio bearers, a radio bearer corresponding to a type of the control plane message, based on
    the type of the control plane message, said type included in the different types of control plane messages, and
    the mapping relationship included in the configuration message; and
    sending, by the first radio backhaul device, a message to the first radio access device by using the selected radio bearer, wherein the message comprises the control plane message,
    wherein both the first radio access device and the second radio access device are connected to the first radio backhaul device.

12. The method according to claim 11, wherein said receiving comprises:
    receiving, by the first radio backhaul device, the configuration message from the first radio access device.

13. The method according to claim 11, wherein said receiving comprises:
    receiving, by the first radio backhaul device, the configuration message from the second radio access device.

14. The method according to claim 11, wherein
    the radio bearer is a signaling radio bearer (SRB) between the first radio backhaul device and the first radio access device.

15. The method according to claim 11, wherein
    the control plane message is an F1 application protocol (AP) message on an F1 interface, and
    the F1 interface is the interface between the first radio backhaul device and the second radio access device.

16. The method according to claim 11, wherein the first radio access device and the second radio access device have different communication standards.

17. The method according to claim 15, wherein
    the first radio access device is a base station in a long term evolution (LTE) system,
    the second radio access device is an integrated access and backhaul (IAB) donor (gNodeB), and
    the first radio backhaul device is an IAB node.

* * * * *